THIRD SPEED – DIRECT SPLIT TORQUE DRIVE

REVERSE

INVENTOR.
John D. Lindsay
BY
T. L. Chisholm
ATTORNEY

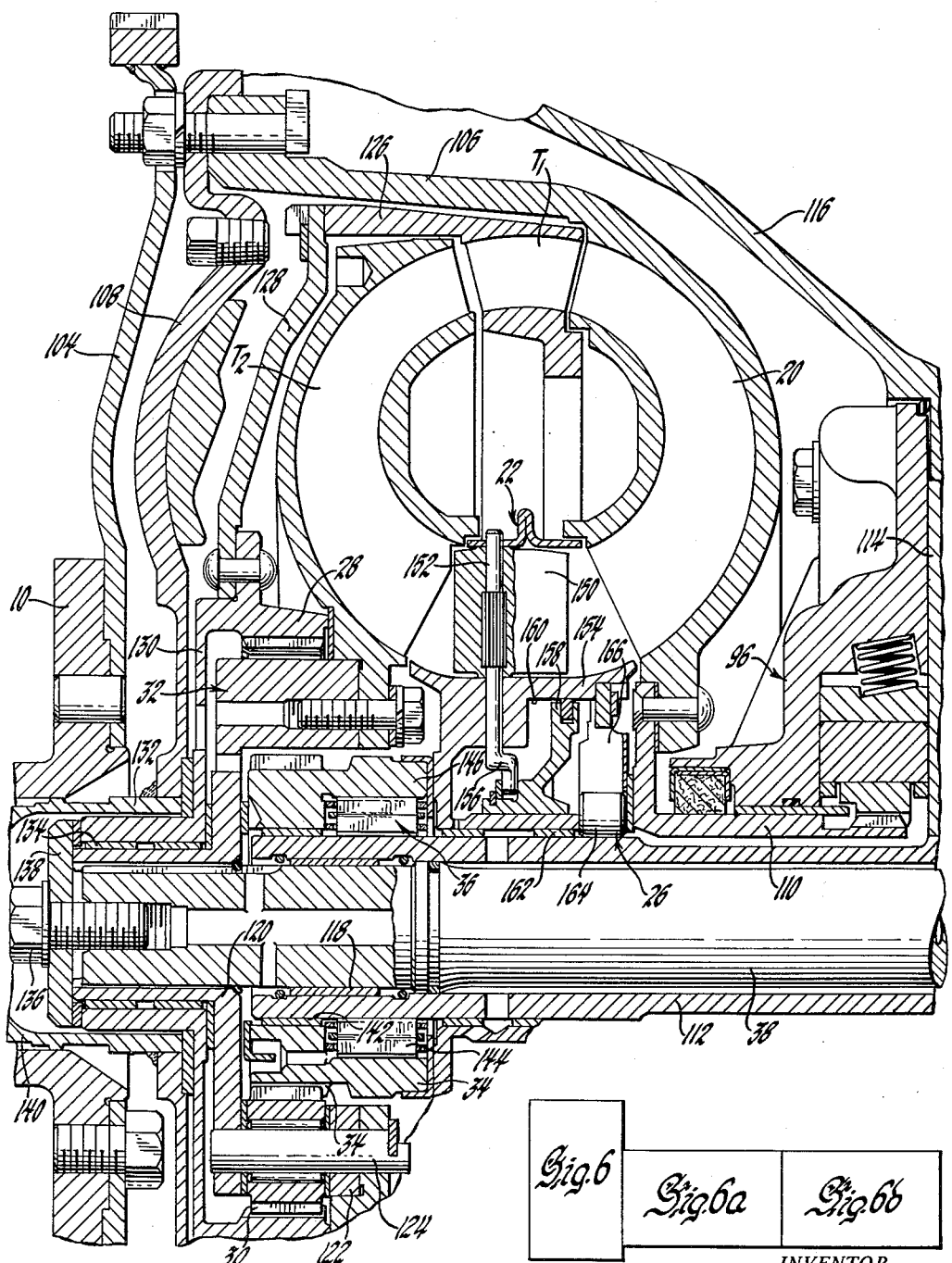

Aug. 21, 1962 J. D. LINDSAY 3,049,937
TRANSMISSION
Filed Nov. 28, 1958 19 Sheets-Sheet 5

INVENTOR.
John D. Lindsay
BY
T. R. Chisholm
ATTORNEY

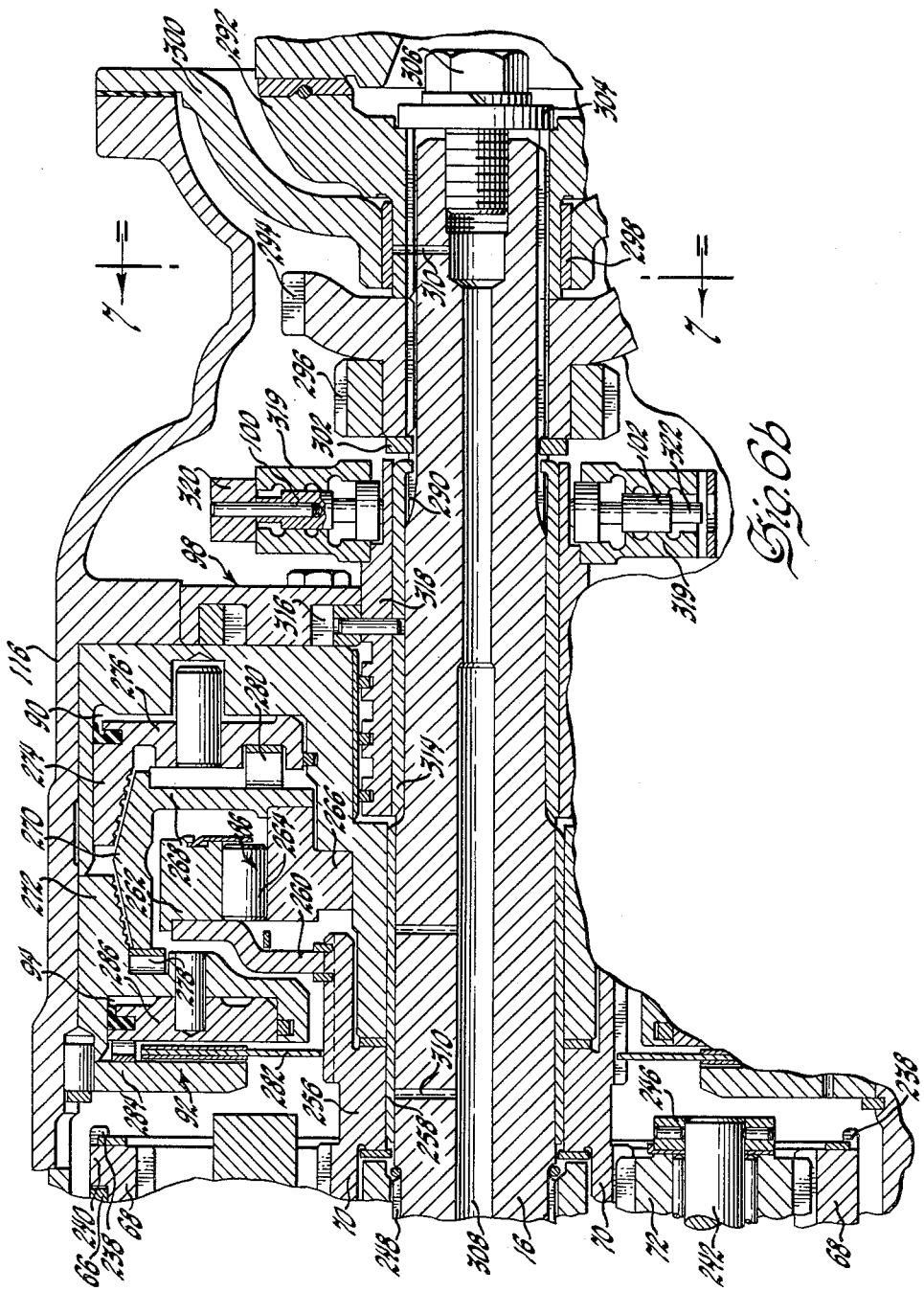

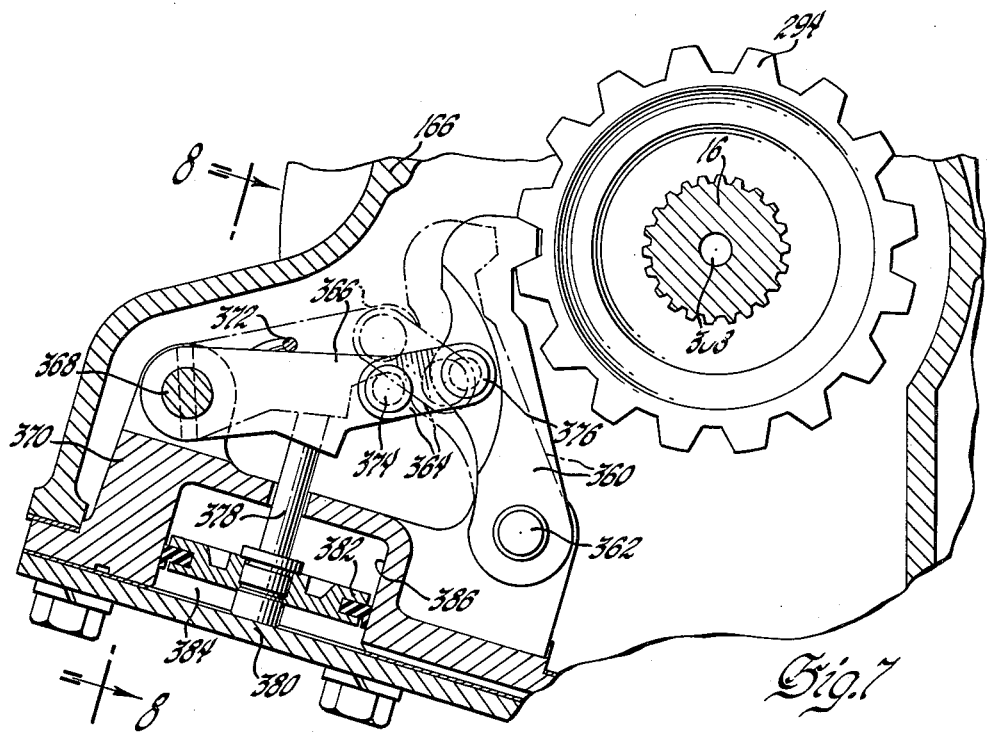
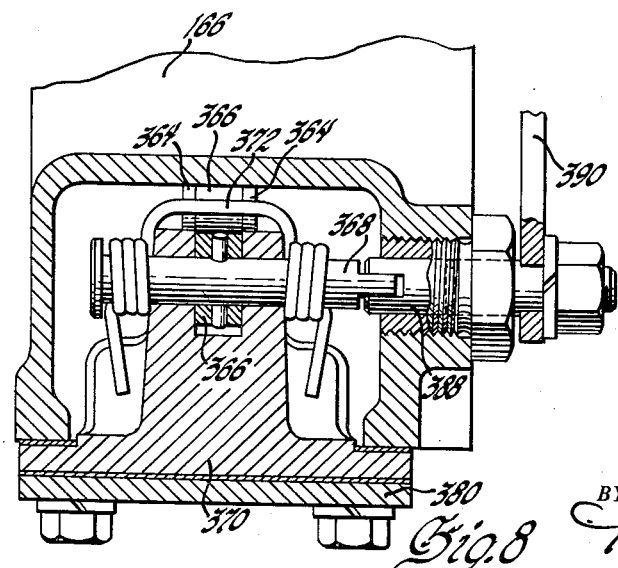

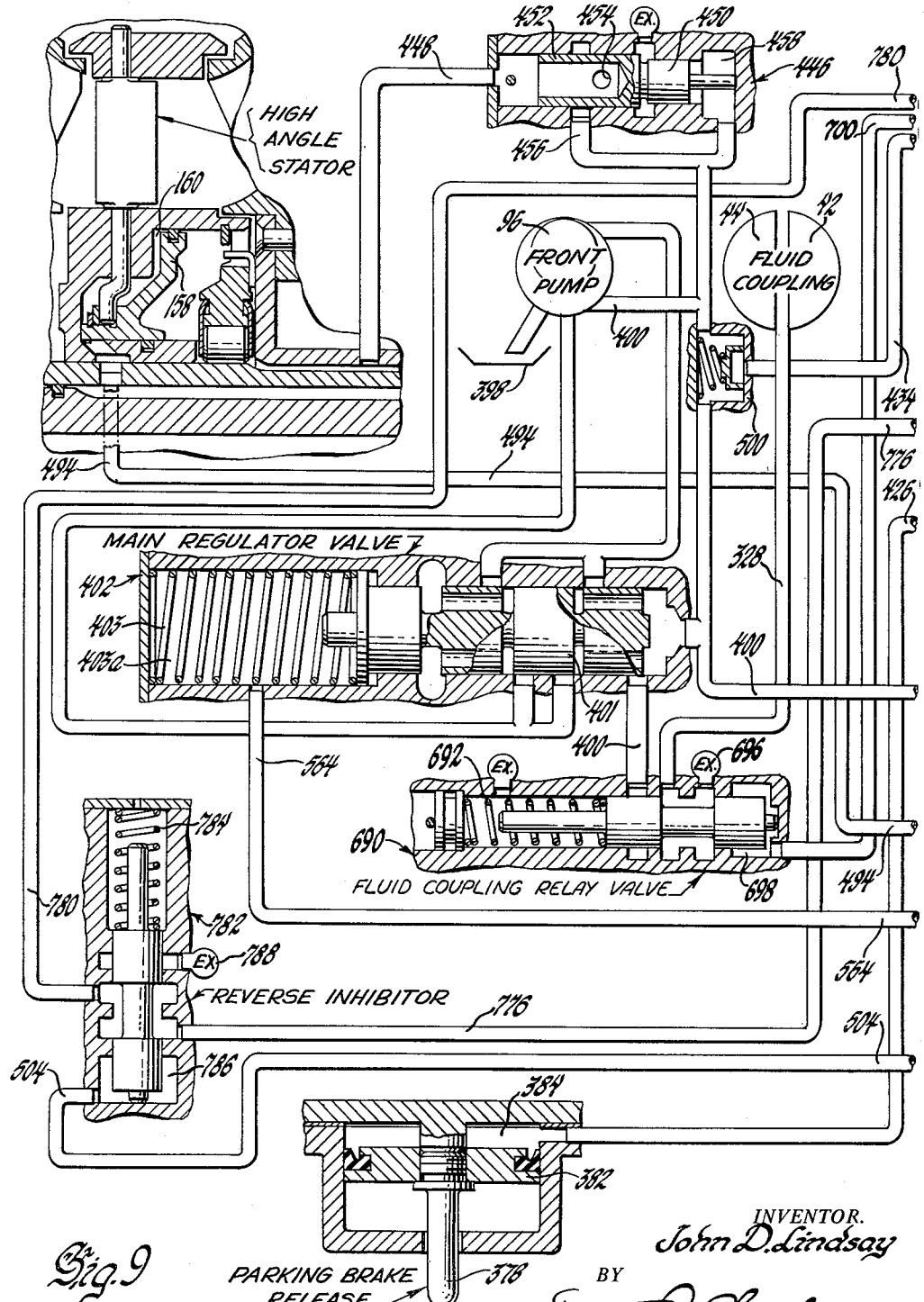

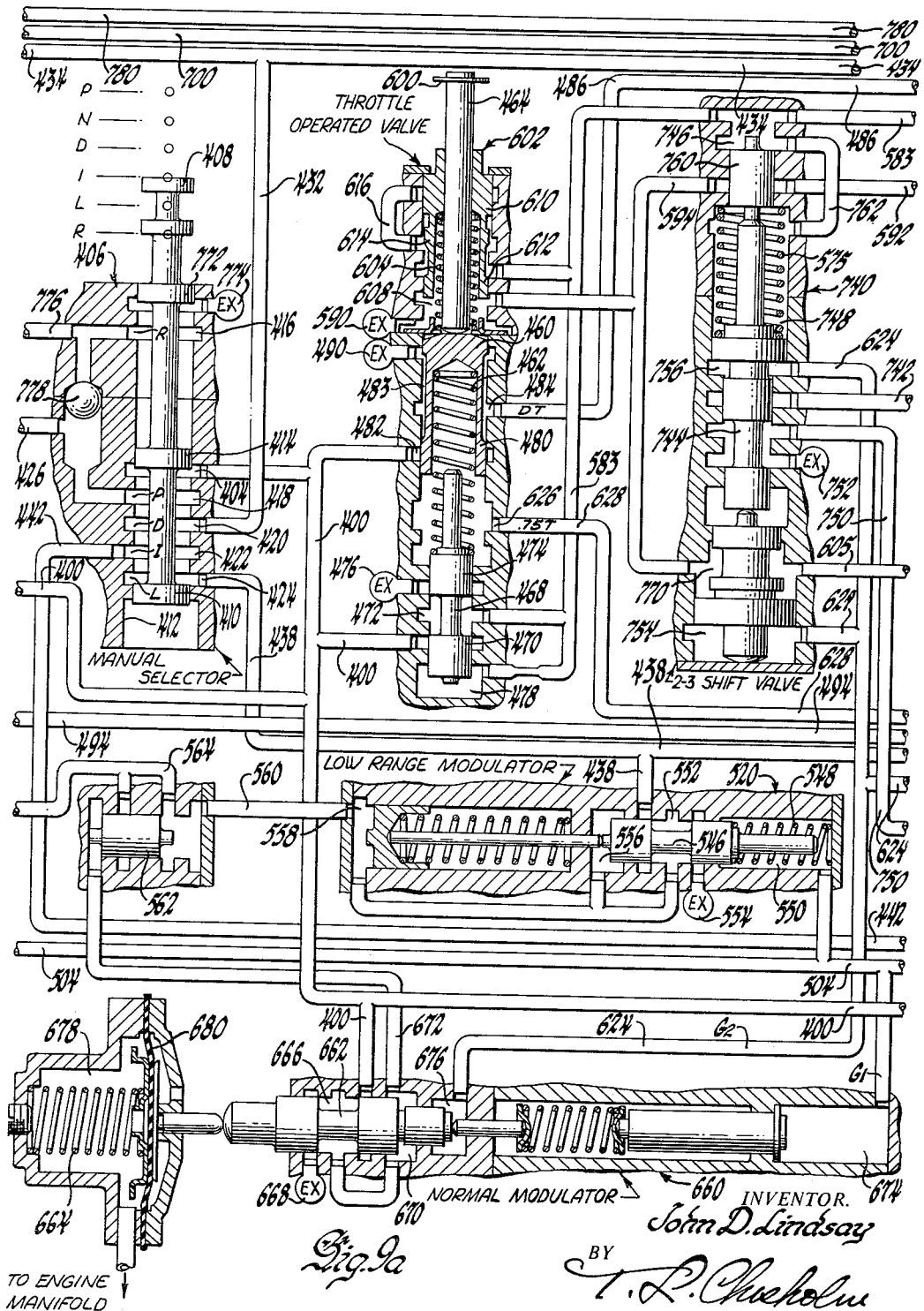

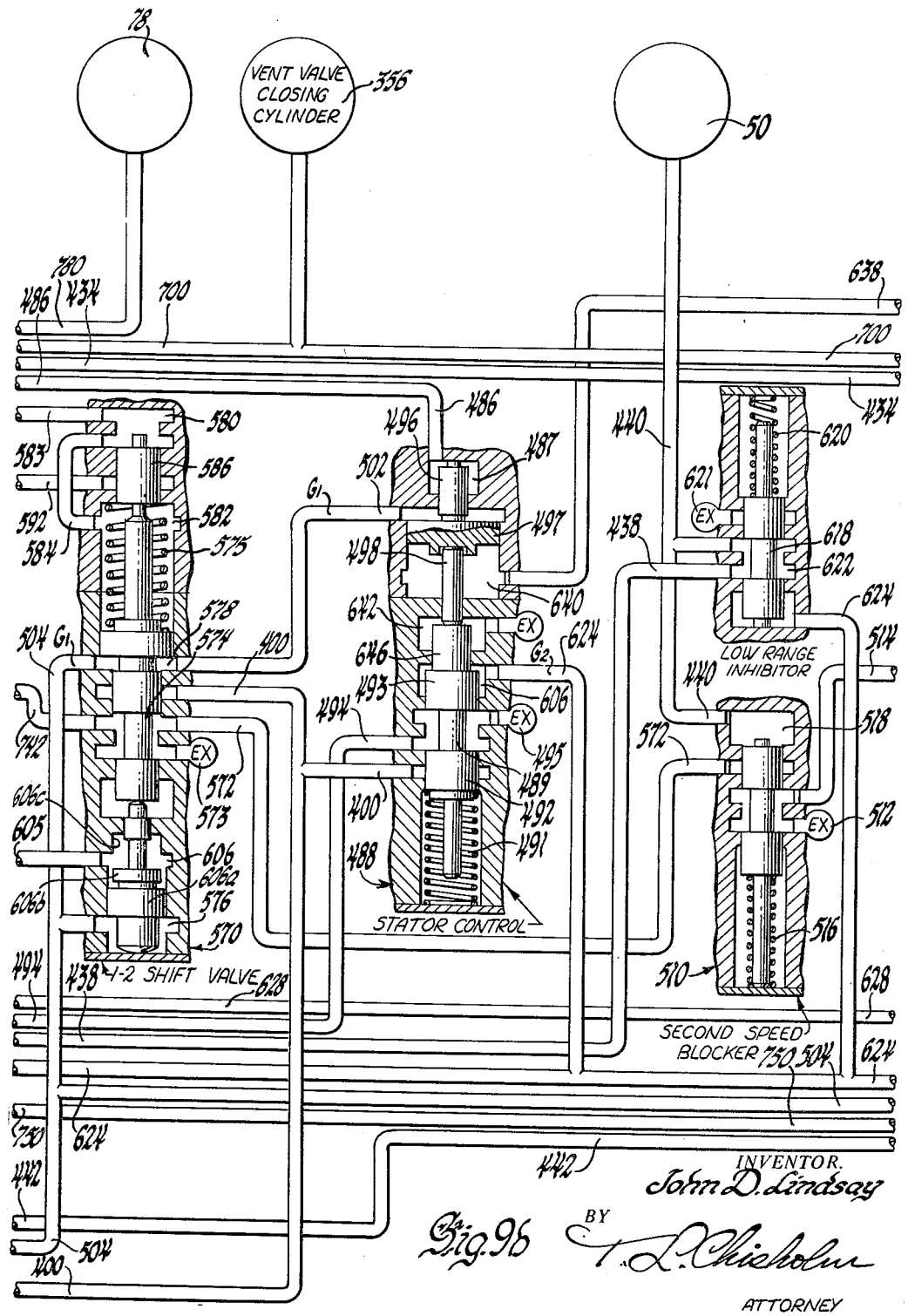

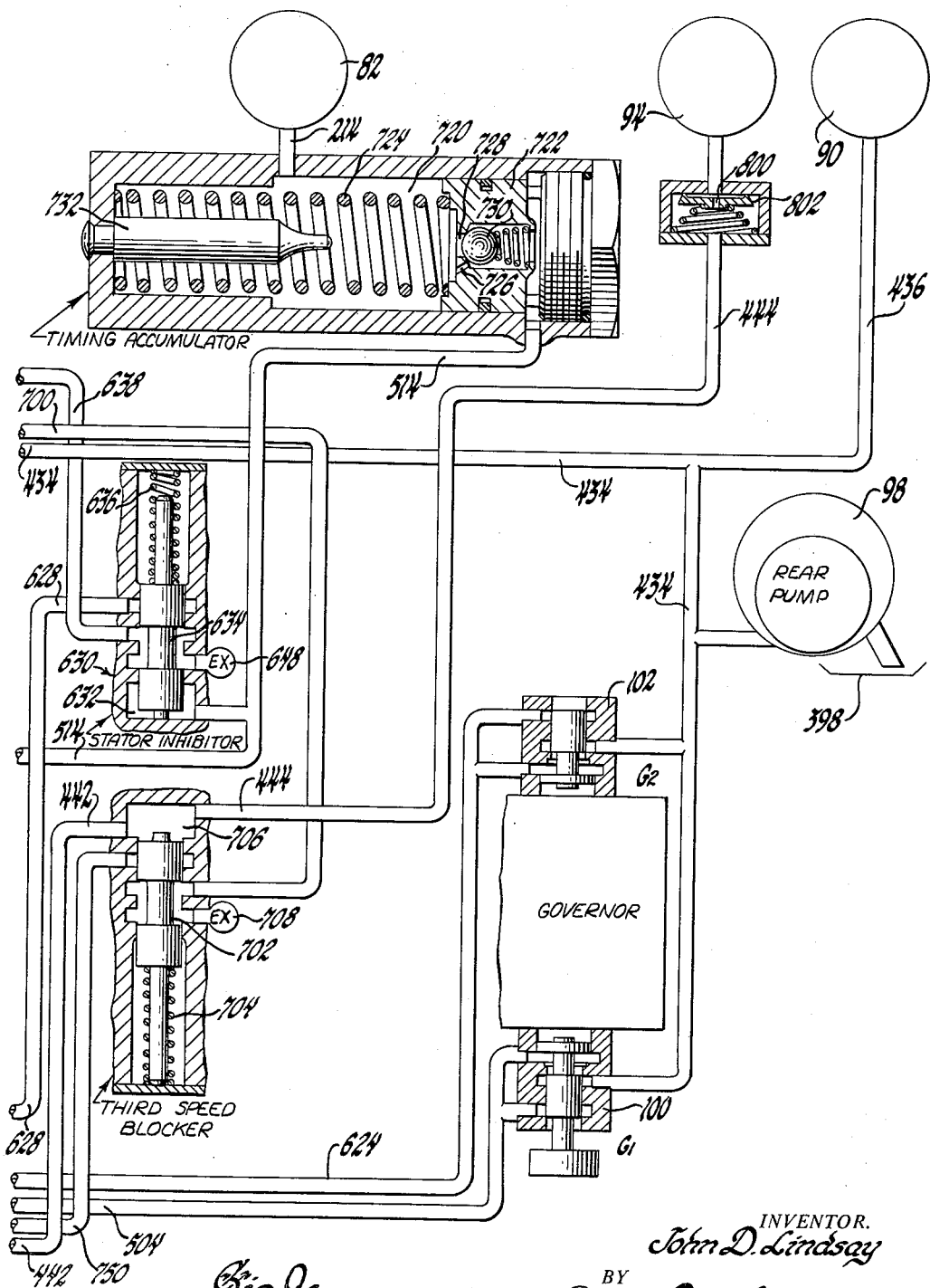

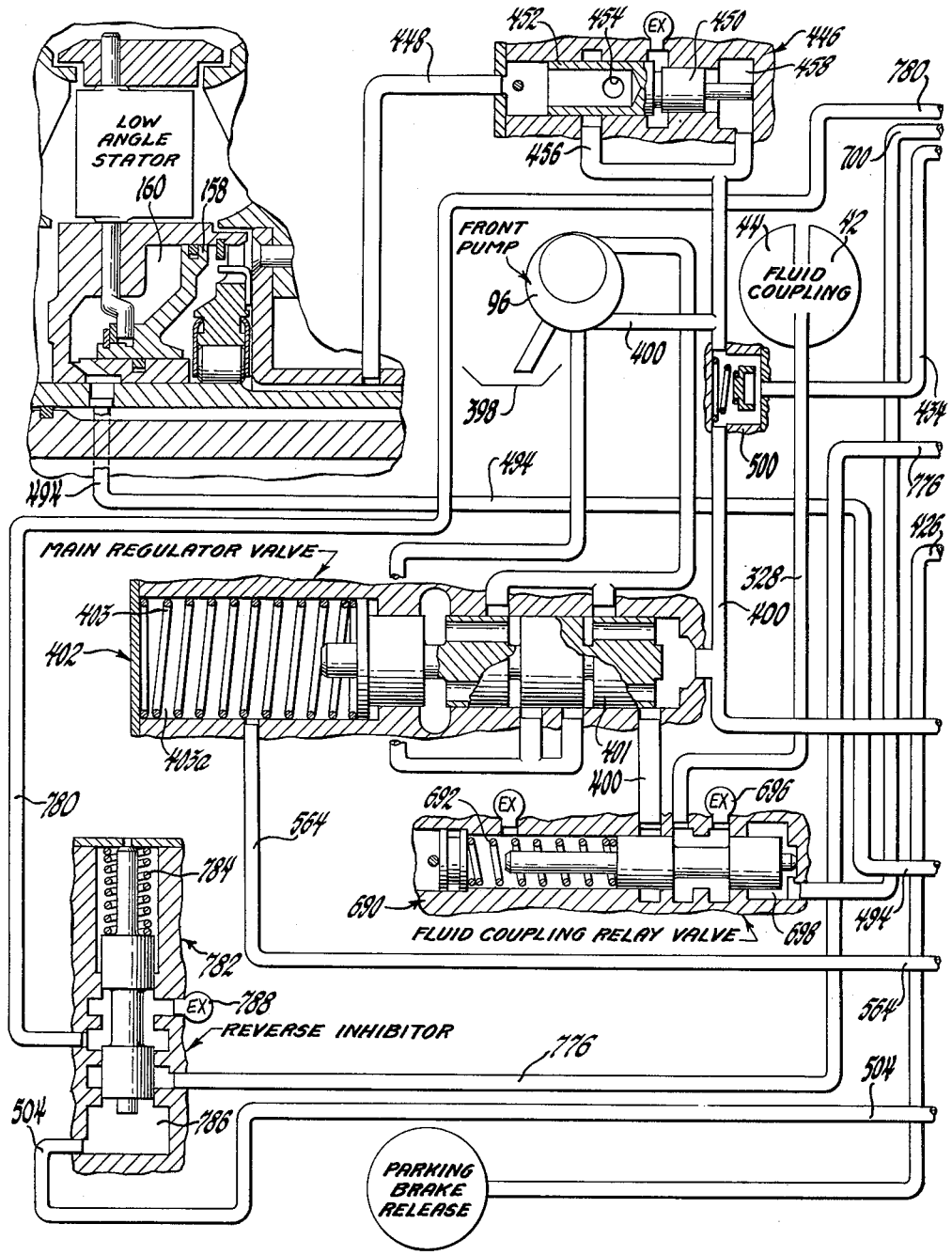

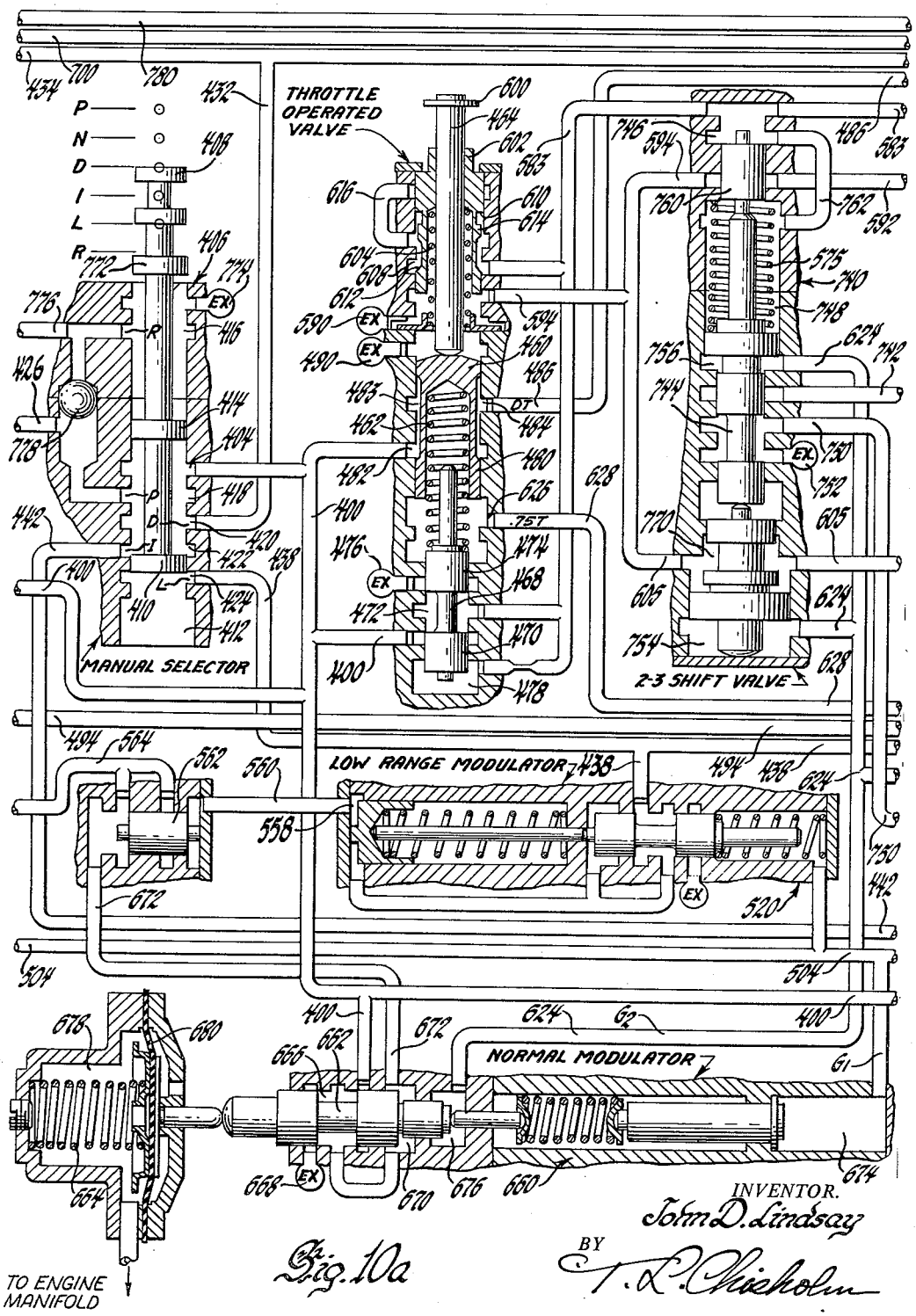

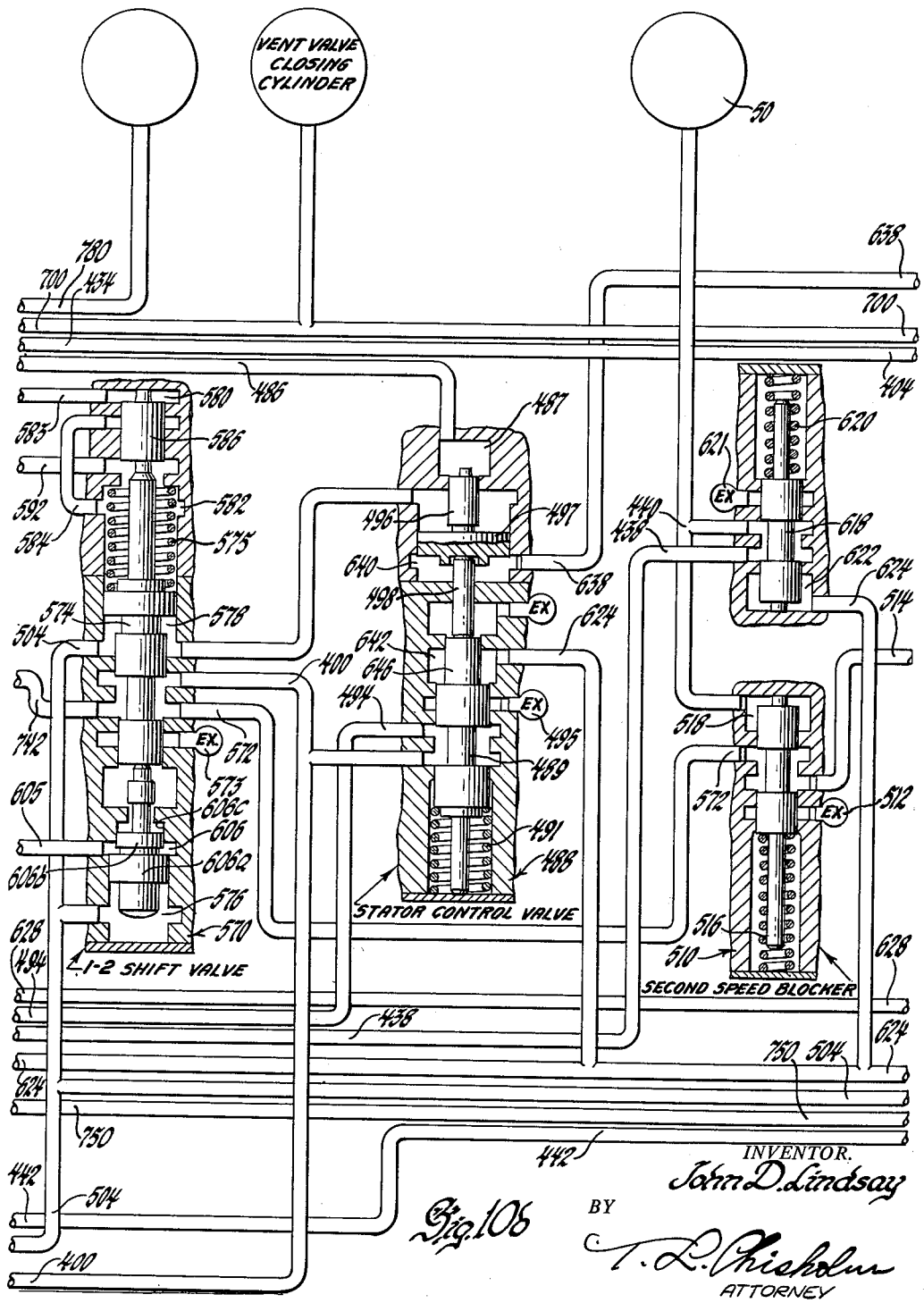

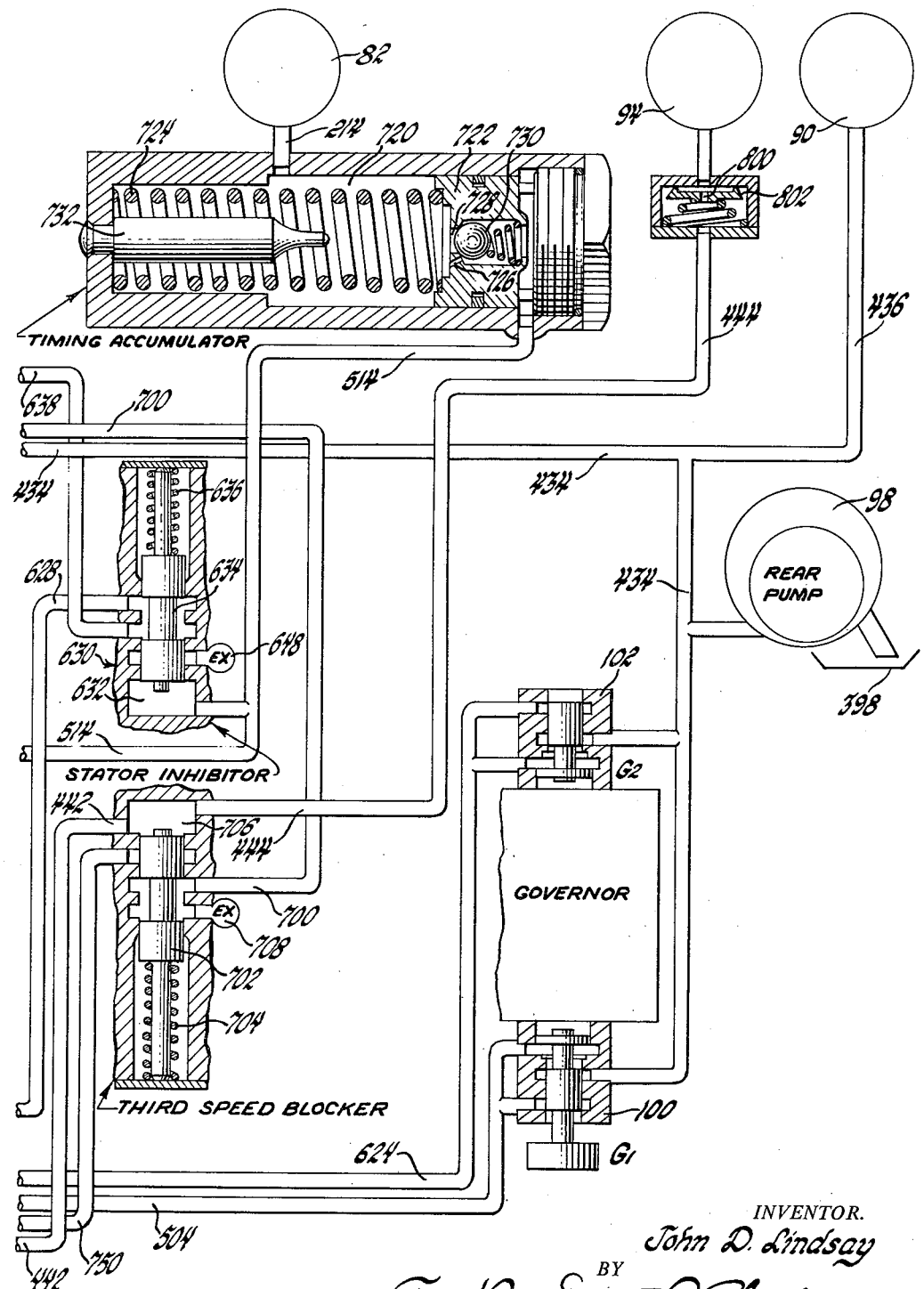

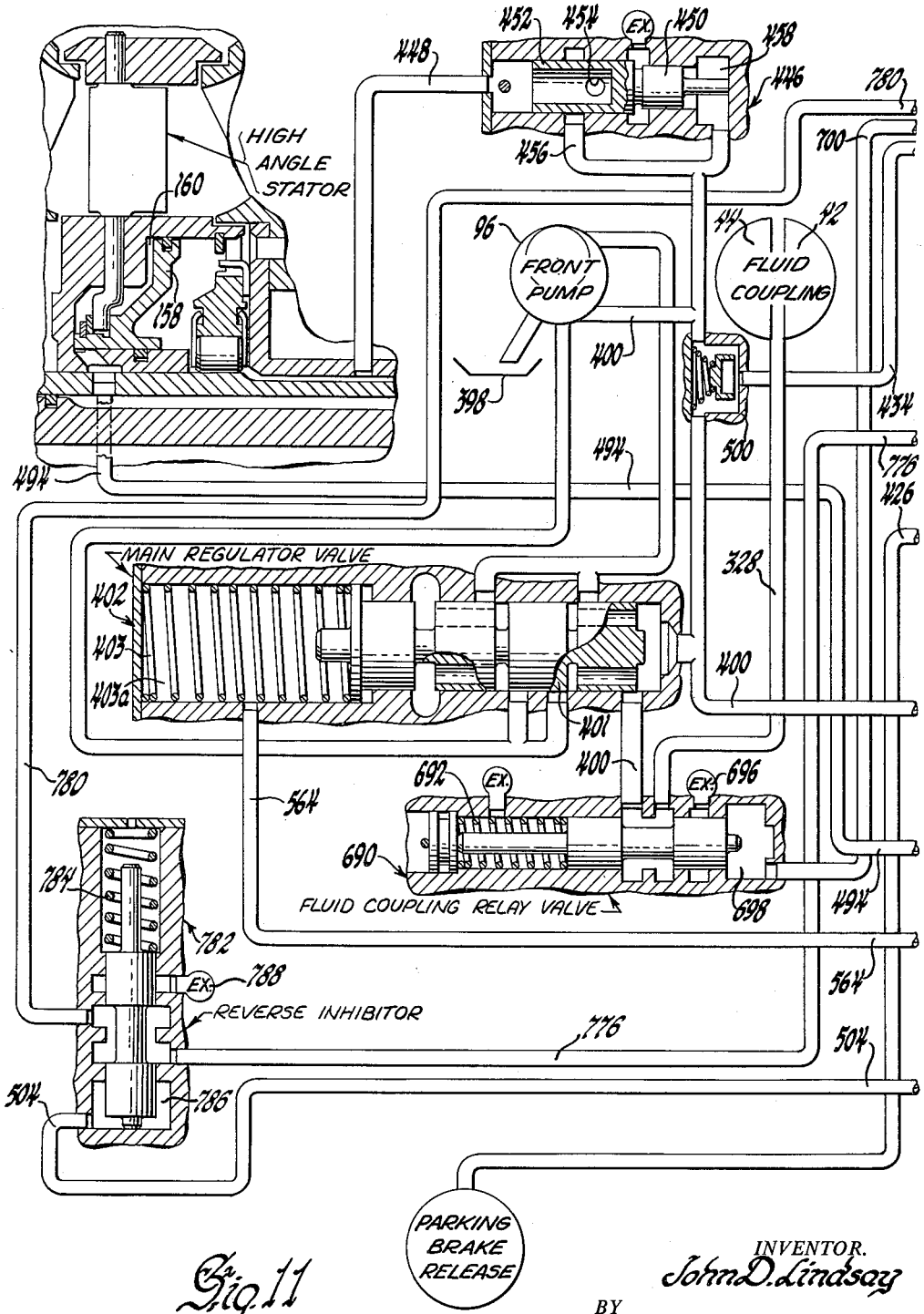

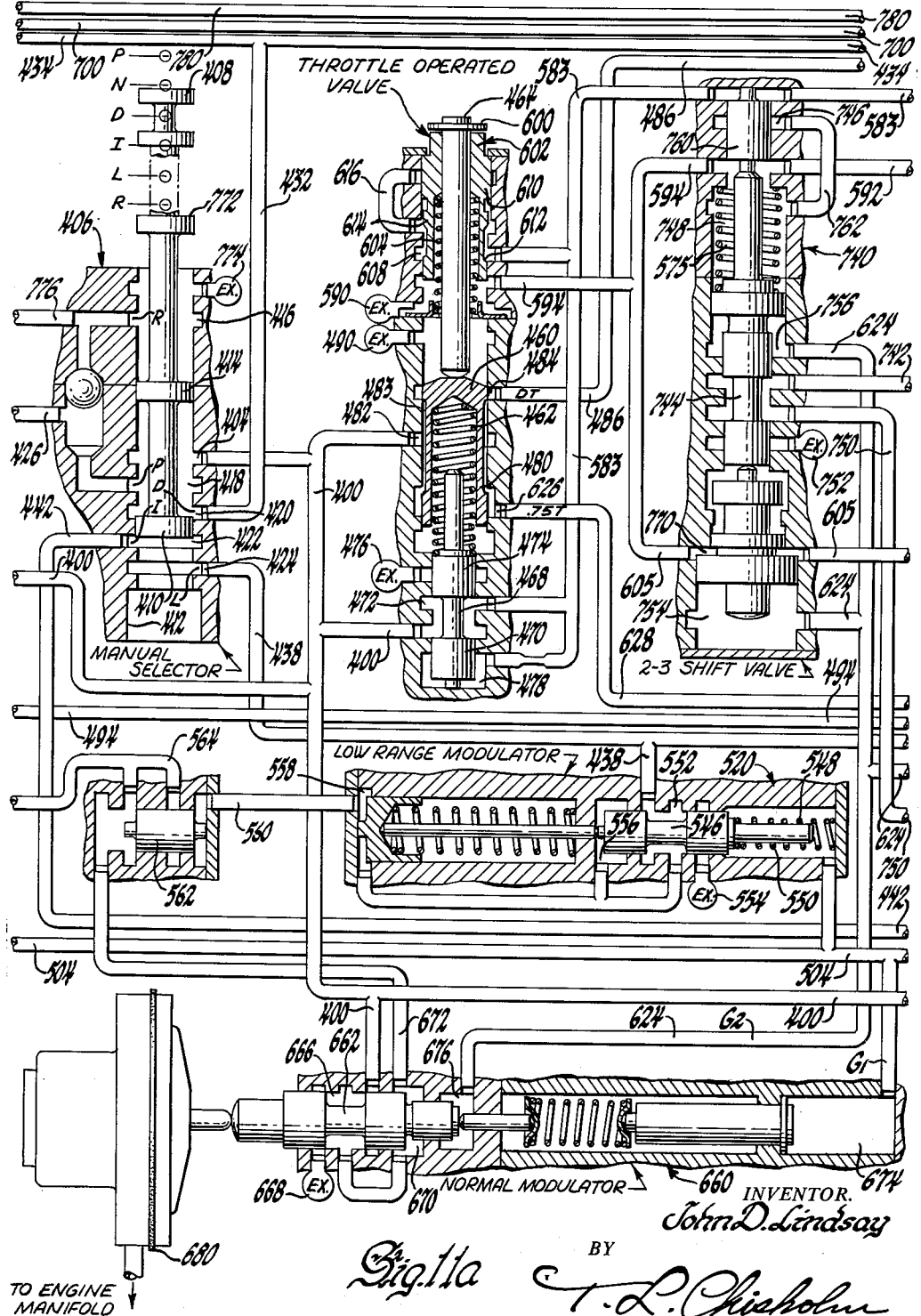

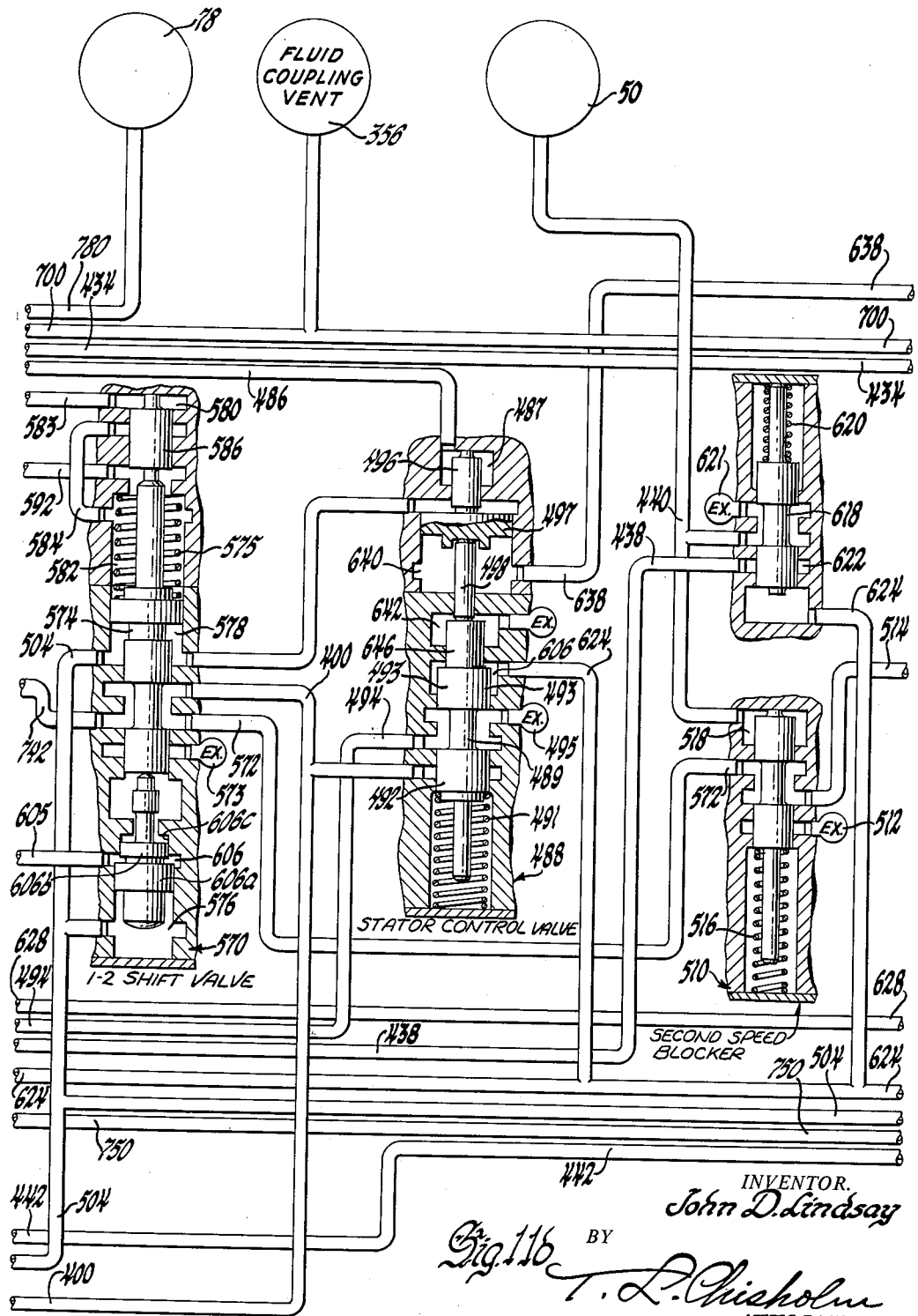

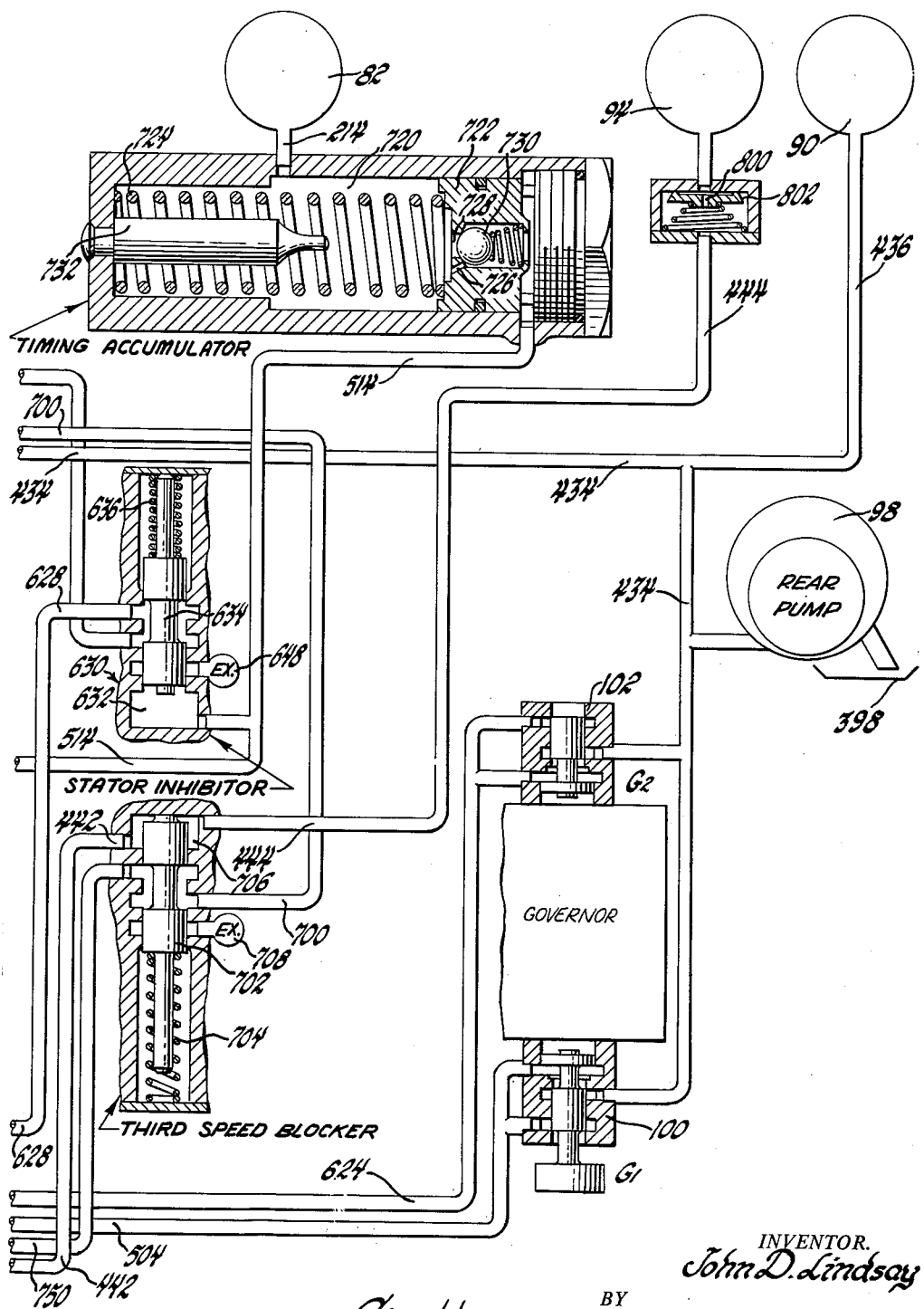

United States Patent Office 3,049,937
Patented Aug. 21, 1962

3,049,937
TRANSMISSION
John D. Lindsay, Birmingham, Mich., assignor to General Motors Corporation, Detroit, Mich., a corporation of Delaware
Filed Nov. 28, 1958, Ser. No. 777,112
18 Claims. (Cl. 74—472)

This invention relates to transmissions of the type in which a hydraulic torque transmitting device drives change-speed gearing which drives an output shaft at a plurality of forward speed ratios, and in reverse. It relates to novel features of construction and arrangement of the change-speed gear; to novel features of the connection between the change-speed gear and the hydrodynamic torque transmitting device; and to novel features of the hydraulic system for controlling the transmission.

In the drawings:

FIG. 1 is one-half of a schematic, substantially symmetrical longitudinal section showing the functional relationship of the elements of a transmission embodying one form of the invention, FIG. 2 is a diagram corresponding to FIG. 1 showing the change-speed which forms part of the transmission in first gear or low speed drive. In this and in FIGS. 3, 4 and 5, dotted lines indicate parts which are not active in the transmission of torque from the hydrodynamic torque transmitting device to the output shaft;

Figure 6A:
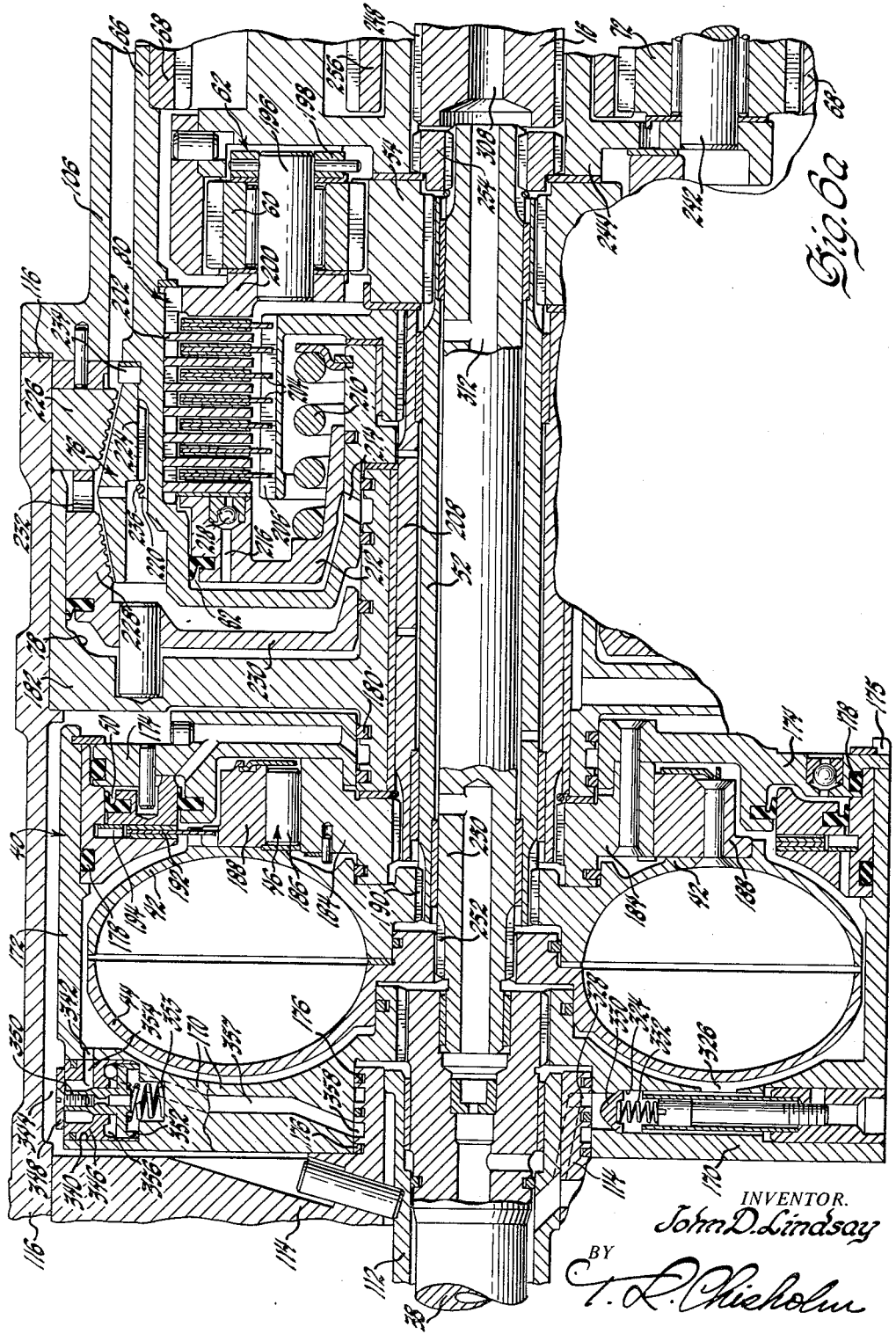

FIGS. 6, 6a and 6b collectively form one-half of a substantially symmetrical longitudinal section of the actual construction of one form of transmission embodying the invention;

FIG. 6c is a diagram of how FIGS. 6, 6a and 6b go together to make a complete drawing of the transmission;

FIG. 7 is a section on the line 7—7 of FIG. 6b showing the construction of a parking brake or lock;

FIG. 8 is a section on the line 8—8 of FIG. 7;

FIGS. 9, 9a, 9b and 9c, when put together in numerical order from left to right, collectively form a functional diagram of one form of hydraulic system for controlling the transmission shown in FIGS. 1 to 8, with the control set for low range, with the engine idling and the car parked;

FIGS. 10, 10a, 10b and 10c similarly show the control set for second speed at about ¼ throttle opening in second or intermediate range, in which the gearing can automatically shift between first and second speeds; and FIGS. 11, 11a, 11b, and 11c similarly show the controls set for third speed at above three-quarters throttle opening in the direct drive range in which the gearing can shift automatically among first, second and third speeds.

Figure 1:
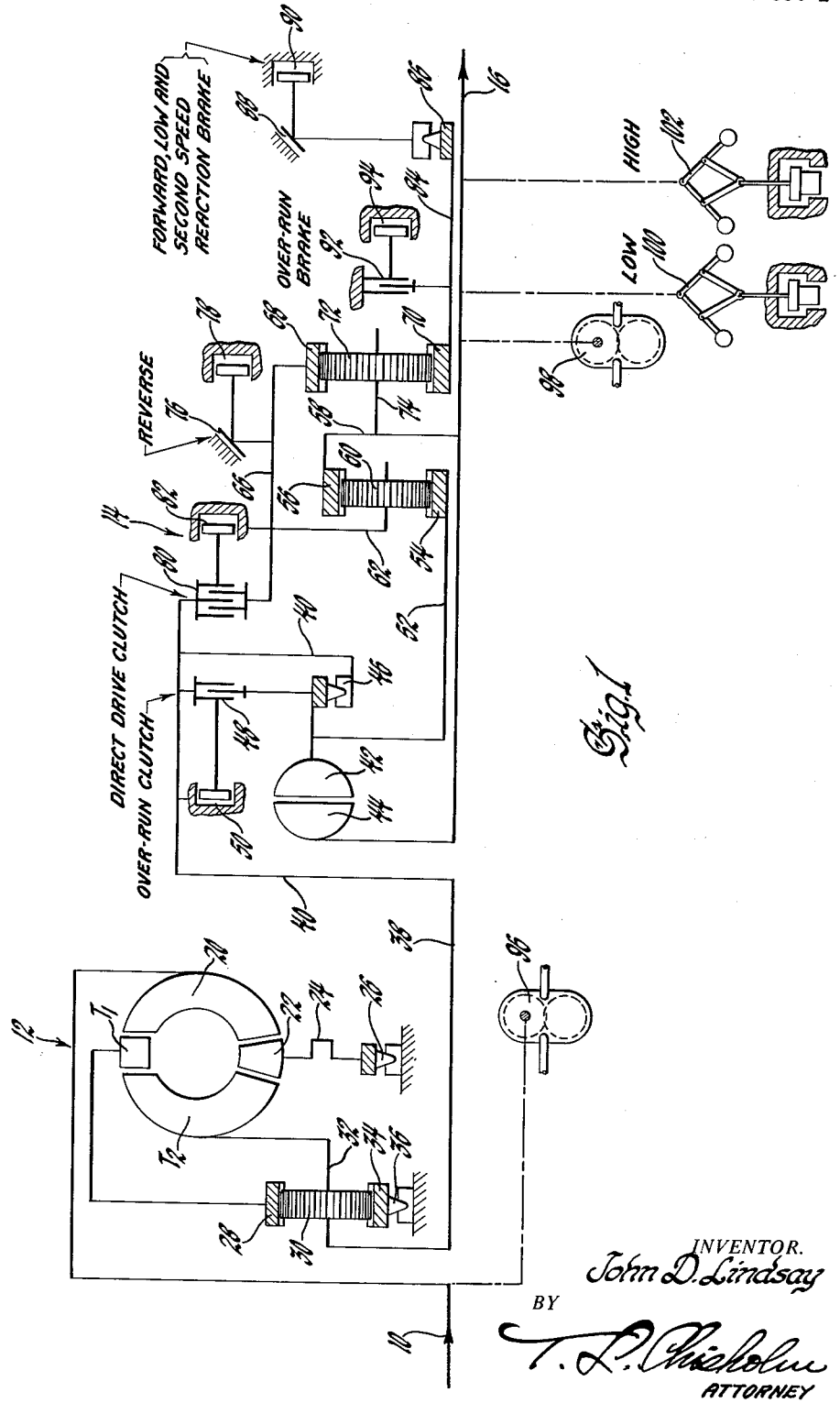

Referring to FIG. 1 the transmission input or driving shaft 10, which may be the crankshaft of the usual internal combustion engine, drives a hydrodynamic torque transmitting device 12 which in turn drives change-speed gearing 14 which drives an output shaft 16 which may be the propeller shaft of a conventional automobile. The hydrodynamic torque transmitting device may be, for example, a torque converter as disclosed in British Patent 770,599, published March 20, 1957, the disclosure of which is incorporated herein by reference. In this example the torque converter has an impeller 20 driven by the engine shaft 10, a first turbine $T_1$ and a second turbine $T_2$, through which the torque transfer fluid is successively circulated, and a reaction element, stator or guide wheel 22, the blade angles of which may be adjusted by any suitable mechanism 24, and which is connected to the frame of the transmission by a one-way brake 26 which permits the stator to rotate forward but prevents it rotating backward as is known in the art. The first turbine drives the input or ring gear 28 of a planetary gear set having planet gears 30 mounted on a carrier 32, and having a reaction sun gear 34 which is connected to the frame of a transmission by a one-way brake 36 which permits the sun gear to rotate forward but prevents it rotating backward as is known. The second turbine $T_2$ is connected through the carrier 32 to the torque converter output shaft 38 which forms the input or driving shaft for the gearing 14. The arrangement is such that the torque converter 12 transmits torque to the converter output shaft 38 at a ratio in respect to the torque on the input shaft 10, which ratio varies with the load on the output shaft 38. That is, when the shaft 38 is stationary or rotating at low speed which indicates high load, the torque ratio between shaft 38 and shaft 10 is high and may be of the order of five-to-one, whereas when the speed of the shaft 38 approaches the speed of the shaft 10 due to a decrease in load on the shaft 38, the torque ratio is near unity.

Shaft 38 is connected to a housing 40 which contains a fluid coupling including a turbine 44 connected to the output shaft 16 and an impeller 42 connected by a hollow shaft 52 to a sun gear 54. The housing and the coupling may be selectively filled with oil or emptied to make the coupling effective or ineffective as will be explained. The housing 40 is connected to the sun gear by a one-way clutch 46 to drive the sun gear forward, but permit the sun gear to overrun or rotate forward faster than the housing 40. The housing 40 may be also connected to the sun gear by an anti-overrun clutch 48 which may be engaged by a hydraulic cylinder 50 to prevent the sun gear from overrunning. The purpose of this arrangement is to use the one-way clutch 46 to transmit the heavy driving torque from the torque converter to the sun gear and use the light clutch 48 to prevent free wheeling when the input to the gearing is through the sun gear, as it is in low forward speed and in reverse, and to let the sun gear 54 rotate forward faster than the housing 40 when the input to the gearing is not through the sun gear 54. Preferably the clutch 48 is small and capable of transmitting only a light torque, much less than the torque required to drive the car through the one-way clutch 46.

The input sun gear 54 is part of a front planetary gear set which includes a ring gear 56 connected by a flange 58 to the output shaft 16, and includes planet gears 60 meshing with the sun gear 54 and ring gear 56 and mounted on a carrier 62 which is connected by a drum 66 to the ring gear 68 of a second or rear planetary gear set. The rear gear set includes a reaction sun gear 70 and planet gears 72 meshing with the ring gear 68 and sun gear 70 and mounted on a carrier 74 which is connected to the flange 58 attached to the output shaft 16. The drum 66, front carrier 62 and the rear ring gear 68 may be held fast to establish reverse drive by friction member 76 which can be grounded by a cylinder 78. I use the generic term torque-establishing device to refer both to clutches and to brakes.

Alternatively, the drum 66, carrier 62 and ring gear 68 may be connected to the fluid coupling housing 40 and to the input shaft 38 by a direct drive clutch 80 which may be set by a hydraulic cylinder 82. The rear reaction sun gear 70 is connected by a hollow shaft 84 through a one-way torque-establishing device 86 to a forward reaction torque-establishing device 88 which may be set by a hydraulic cylinder 90. This provides reaction torque for forward drive, as will be explained. Free-wheeling may be prevented by an over-run torque-establishing device 92 connected to the shaft 84, and settable by any suitable hydraulic cylinder 94.

Any suitable oil pump such as front pump 96 may be driven by the engine shaft 10 to provide a source of oil under pressure in response to rotation of the engine, for operating the controls of the transmission. Another oil pump 98 called the rear pump is driven by the output shaft 16 to provide a source of oil under pressure responsive to forward movement of the car. A low speed governor valve 100 and a high speed governor valve 102 may also be driven by an output shaft 16.

Figure 2:
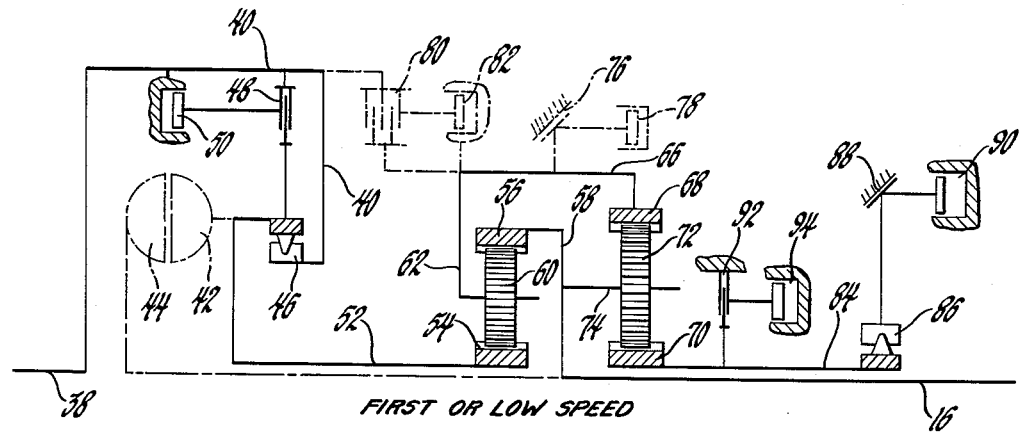

Referring to FIG. 2, to establish low or first speed drive between the torque converter output shaft 38 and the final drive shaft 16, the overrun torque-establishing device 48 is set, the forward reaction torque-establishing device 88 is set, the overrun torque-establishing device 92 is set, the direct drive torque-establishing device 80 and the reverse torque-establishing device 76 are released, and the fluid coupling 42—44 is emptied. The input shaft 38, through casing 40, one-way clutch 46 and shaft 52, drives the front input sun gear 54 at a speed, with relation to the speed of the engine shaft 10, that is determined by the torque converter 12. Initial resistance to movement of the car holds the shaft 16 stationary which temporarily holds the front ring gear 56 stationary to act as a reaction gear for the front planetary gear set. This causes the front carrier 62 to exert forward torque on the rear ring gear 68 and this exerts reverse torque on the sun gear 70 and forward torque on the carrier 74 and output shaft 16. Because the one-way clutch 86 and the forward reaction torque-establishing device 88 prevent reverse rotation of the sun gear 70, this drives the output shaft 16 forward at a reduced speed which takes advantage of the speed reductions effected by both the front and rear planetary gear sets. The overrun torque-establishing devices 48 and 92 prevent the car from freewheeling when the car tends to run faster than the engine would drive it.

Figure 3:
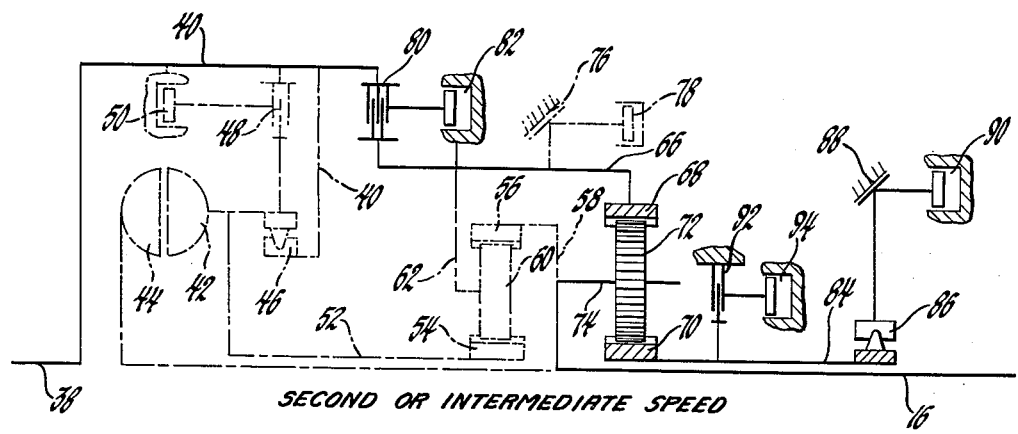
FIG. 3 is a diagram corresponding to FIG. 2 of the change-speed gearing in second gear or intermediate speed.

Referring to FIG. 3, to set the gearing in second or intermediate speed, the overrun torque-establishing device 48 is released, fluid coupling 42—44 is emptied, the direct drive torque-establishing device 80 is set, the reverse torque-establishing device 76 is released, the overrun torque-establishing device 92 is set, and the forward reaction torque-establishing device 88 is set. The gearing input shaft 38 now drives the rear ring gear 68 through the casing of the fluid coupling 40, the direct drive torque-establishing device 80 and the drum 66. The rear reaction sun gear 70 is held against reverse rotation by the torque-establishing devices 86 and 88 as in low speed and this drives the carrier 74 and output shaft 16 at a speed reduction determined by the ratio of the rear planetary gear set 68—72—70, alone. The one-way clutch 46 lets the front sun gear 54 run faster than the casing 40 and carrier 62 and this lets the front planetary gearset 56—60—54 idle. Freewheeling on overrun is prevented by the torque-establishing device 92.

Figure 4:
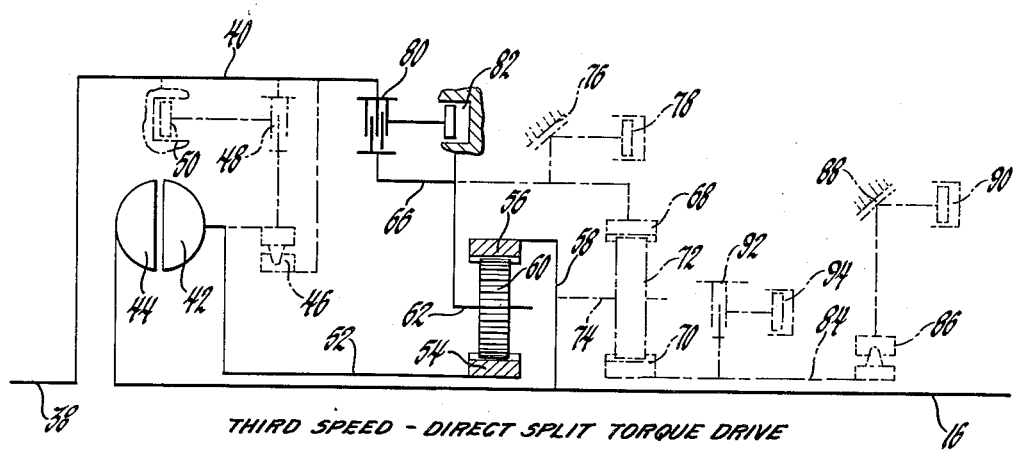
FIG. 4 shows the gearing in third speed or direct drive.

Referring to FIG. 4, provision is made for a third speed which is a direct drive with the input torque divided between mechanical drive and fluid drive. To establish third speed the fluid coupling 42—44 is filled, the overrun torque-establishing device 48 is released, the direct drive torque-establishing device 80 is engaged, the reverse torque-establishing device 76 is released, the overrun torque-establishing device 92 is released, and the forward reaction torque-establishing device 88 remains engaged but inactive, allowing sun gear 70 to turn forward, because of one-way device 86.

This drives the front carrier 62 by direct mechanical connection to the input shaft 38, the carrier now being the input member of the front planetary gear set. This gearset impresses forward torque on both the ring gear 56 and the sun gear 54, which latter through fluid coupling 42—44 impresses its torque on the output shaft 16. Thus the output shaft 16 is driven substantially at the speed of the input shaft 38, and the torque from the shaft 38 is divided by the front gearset into a mechanical component through ring gear 56 and a hydraulic component through sun gear 34. The ratio of the components is established by the ratio of the number of teeth in the ring gear to the number of teeth in the sun gear, the proportion through the sun gear being the smaller, as is known. Since the ring gear 56 and the turbine 44 necessarily turn at the speed of the shaft 16, and the sun gear 54 runs faster than the ring gear 56, the sun gear drives the mipeller 42 faster than the speed of the casing 40, as permitted by the one-way clutch 46.

Figure 5:
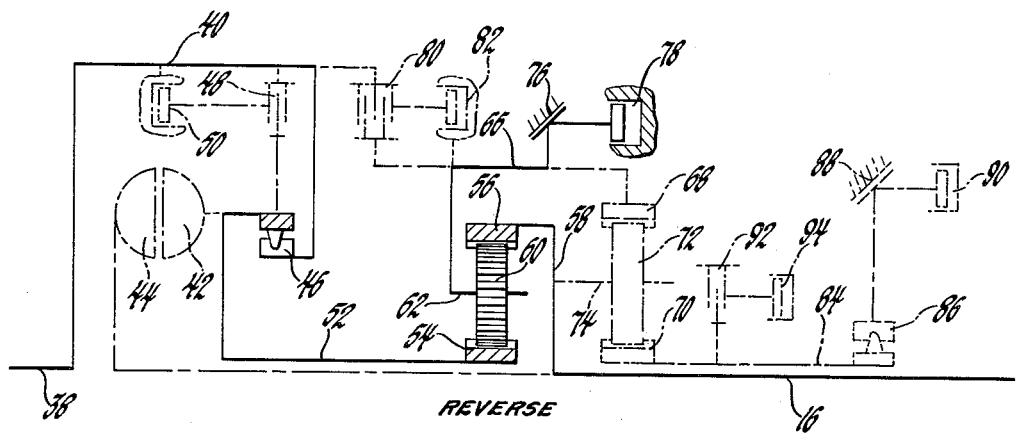
FIG. 5 shows the gearing in reverse.

Referring to FIG. 5 for reverse drive the overrun torque-establishing device 48, the direct drive torque-establishing device 80, the overrun torque-establishing device 92 and the forward reaction torque-establishing device 88 are all released, the fluid coupling 42—44 is emptied, and reverse torque-establishing device 76 is set. The torque converter output shaft 38 now drives the shaft 52 through the one-way clutch 46, and because the torque-establishing device 76 holds the carrier 62, the sun gear 54 drives the ring gear 56 backward which drives the output shaft 16 backward at low speed ratio.

STRUCTURE

Torque Converter

FIGS. 6, 6a, 6b collectively show one form of actual structure of transmission embodying the invention. The engine shaft 10 is connected by a drive plate 104 to an outer shell or casing 106 and front cover plate 108 collectively forming an enclosure or container for the torque converter. At its rear or right end the shell 106 is riveted to a front pump drive shaft 110 splined to the front pump 96 which may be of any suitable form such as either of those disclosed in FIGS. 15 and 16 of the U.S. patent to Herndon, 2,763,162, Sept. 18, 1956, the disclosure of which is included herein by reference. The impeller 20 is secured to the casing 106 or forms a part of it.

The front pump drive shaft 110 surrounds a stationary hollow shaft or ground sleeve 112 rigidly supported as shown in FIGS. 6 and 6a by a wall or partition 114 forming part of the transmission casing or frame 116. The ground sleeve extends forwardly in the transmission (toward the left as shown in FIG. 6) and at its forward end supports the torque converter output shaft 38 in a bearing 118. The front end of this shaft 38 is connected to the planet carrier 32 by being splined to a front cheek plate 120 forming part of the carrier 32 which is bolted to the second turbine $T_2$. The carrier includes a rear cheek plate 122 and spindles 124 for the planetary gears 30.

The first turbine $T_1$ is secured to or forms part of a drum 126 keyed to a flange 128 riveted to the ring gear 28 which is integral with a flange 130 and supporting sleeve 132, which latter is supported for rotation on the carrier 32 by bearings 134. The torque converter output shaft 38, carrier 32, ring gear 28 and bearings 134 are held together by a bolt 136 and cap 138. The front cover plate 108 includes a cup or housing 140 for the end of the shaft 38 and the structure it supports. The housing 140 is supported in a bore in the rear end of the crankshaft 10.

The reaction sun gear 34 is rotatably supported on the front end of the ground sleeve 112 by a bearing 142 and is prevented from rotating backwards by the one-way device 36 which may be of any suitable known form, herein exemplified as rollers 144 between an inner race formed by the hardened front end of the ground sleeve 112 and an outer race or cam ring 146 integral with the sun gear 34.

The stator 22 includes reaction blades 150 each fixed to a radial shaft 152 which determines the angular position of the blade. The shafts 152 are pivoted in a stator hub 154 and have crank arms 156 in a groove in an annular piston 158 slidable in an annular fluid pressure chamber 160 for positioning the stator blades. As will be explained, the control system can supply pressure to the cylinder 160 to the left of the piston 158 to hold the piston in the position shown, in which the blades are at low angle or low torque ratio position, or the control system can vent the cylinder 160 to permit converter pressure to push the piston 158 to the left to hold the blades in high angle or high torque ratio position. The entire stator structure is supported for rotation on the ground sleeve 112 by bearings 162 and is prevented from rotating backward by the one-way device 26 which may be of any suitable form as represented by the rollers 164 operating between an inner race formed by the hardened outer surface of the ground sleeve 112 and an outer race or cam ring 166 secured in the stator hub.

Gearing

As shown at the left of FIG. 6a the rear or right end of the torque converter output shaft 38 is keyed or splined to a front radial flange 170 formed integral with an outer cylindrical drum 172 which is keyed to a rear radial flange 174 as by teeth 175 shown at the bottom of the drawing. The flanges and drum together constitute the fluid coupling casing 40 which is at times to be filled with oil under pressure. In order to contain the oil in the casing the front flange 170 has a rotating seal connection 176 with a sleeve forming part of the stationary wall 114 and the rear flange 174 is sealed to the drum 172 by a gasket 178 and has a rotating sealing connection 180 with a flange on a stationary wall 182.

The front flange 170 contains control valves, which will be described, for admitting and releasing oil from the casing 40.

As shown in the lower half of the drawing, the rear flange 174 is riveted to the inner race 184 of the one-way clutch 46 whose rollers or sprags 186 engage a cam ring or outer race 188 of known form riveted to the impeller 42 of the fluid coupling 42—44. The impeller is splined at 190 to the gearing input shaft 52. The one-way clutch 46 is arranged so that forward rotation of the casing 40 drives the impeller, but the impeller can rotate forwardly faster than the casing 40. The impeller 42 and outer race 188 are also splined to the driving plate 192 of the overrun clutch 46 which may be set by the piston 194 when oil under pressure is admitted to the cylinder 50. This locks the impeller to the casing 40 so that the car can drive the engine which thus serves to brake the car.

The gearing input shaft 52 is keyed at its rear or right end, as FIG. 6a is seen, to the front input sun gear 54 which meshes with the planets 60 journalled on spindles 196 forming part of the carrier 62 and supported in a rear cheek plate 198 and a front cheek plate 200 keyed to the drum 66 and splined to the driven plates 202 of the direct drive clutch 80. The driving plates 204 of the clutch 80 are splined to a clutch hub 206 splined to the rear end of a hollow shaft 208, the front end of which is splined to the rear flange 174 of the fluid coupling casing 40 so that the driving plates 204 are driven by the torque converter output shaft 38. The main clutch 80 is normally disengaged by a release spring 210 which constantly urges to the left a clutch apply piston 212 which can be moved to the right to engage the clutch by the pressure of oil admitted to the cylinder 82 through a control passage 214 near the center of the cylinder, formed integral with the drum 66. In order to insure release of the clutch and prevent the building up of centrifugal pressure in the chamber 82 when the pressure in the passage 214 is released, the piston is provided near its rim with the release passage 216 and a centrifugal dump valve 218 which may be constructed as shown in the U.S. patent to Harold Fischer 2,740,512, the disclosure of which is included herein by reference.

On the outer surface of the drum 66 are splines 220 which engage splines on the driven drum 224 of the reverse torque-establishing device 76 which is of double frusto-conical form and is placed between a frusto-conical ground shoe 226 fixed to the casing 116 and a frusto-conical apply shoe 228 forming part of a piston 230 doweled to the casing 116 and sliding in the cylinder 78 formed in the wall 182 fixed to the casing. The ground shoes 226 and 228 are urged apart by a release spring 232 and the driven drum 224 is urged out of contact with both shoes by a second release spring 234 which urges the drum 224 against a stop 236, except when fluid under pressure is admitted to the cylinder 78 to establish reverse drive by holding the carrier 62, as explained above.

As shown at the right of FIG. 6a and at the left of FIG. 6b the drum 66 is keyed to the ring gear 68 by teeth 238 on the drum 66 and intermeshing teeth 240 on the ring gear 68. The ring gear 68 engages the planet gears 72 journaled on spindles 242 supported in a front cheek plate 244 (FIG. 6a) and a rear cheek plate 246 (FIG. 6b) which plates form parts of the carrier 74 connected to the output shaft 16 by splines 248.

As shown in FIG. 6a the turbine 44 of the fluid coupling 42—44 is connected to the output shaft 16. For mechanical convenience this connection is formed by a shaft 250 secured at its front end to the turbine 44 by a spline 252, and splined at its rear end to the interior of a ring 254, the outside of which is splined to the front cheek plate 244 of the carrier 74 and so is connected to the output shaft 16. The planet gears 72 mesh with the reaction ring gear 70 which is formed integral with a short hollow shaft 256 rotatably supported on the output shaft 16 by a bearing sleeve 258. At its rear end the shaft 256 is splined to a flange 260 riveted to the outer race 262 of the one-way device 86 having sprags or rollers 264 running on an inner race 266 riveted to a flange 268 integral with a double frusto-conical drum 270 disposed between frusto-conical ground shoes 272 and 274 non-rotatably mounted in the casing 166. Preferably, the ground shoe 274 is formed integral with the piston 276 in the fluid pressure cylinder 90 to which oil under pressure may be admitted to engage the brake against the force of the return springs 278 and 280 and thus hold the inner race 266 to prevent reverse rotation of the sun gear 70.

Also, splined to the tube 256 forming part of the sun gear 70 is the driven plate 282 of the overrun torque-establishing device 92 which includes a stationary disc 284 secured to the casing and a piston 286 operating in the cylinder 94 to which oil under pressure may be admitted to hold the sun gear 70 positively against rotation in either direction.

The rear end of the output shaft 16, as shown at the right of FIG. 6b, has a long spline 290 for securing an output drive connection such as the universal joint 292 and the parking gear or lock 294 and speedometer driving gear 296. The universal joint 292 may be supported in a bearing 298 in a bearing container 300 secured to the casing 166. The speedometer gear, parking lock and universal joint are all secured axially to the drive shaft 16 between a stop or snap ring 302 and a washer 304 held by a bolt 306. Shaft 16 is provided with a central bore 308 forming a lubricating supply duct connecting with various lubricating passages 310 and registering with a similar bore 312 in shaft 250 (FIG. 6a).

The output shaft 16 also carries a drive sleeve 314 interlocked with the spline 290 and pinned to the driving gear 316 of the rear pump 98 and pinned to a governor drive sleeve 318 to which is fixed a governor casing 319 which carries the low speed governor valve 100 and the high speed governor valve 102. The arrangement and construction of the governor may be as shown in the U.S. Patent to Thompson 2,204,872, June 18, 1940, the disclosure of which is included herein by reference. As is known the governor constitutes two sources of control oil, the pressure of which is measured by the speed of the output shaft. The low speed governor valve includes a relatively heavy centrifugal weight 320 which increases the control pressure rapidly as the car speed increases and the high speed governor valve 102 has a relatively light centrifugal weight 322 which provides a slower increase in pressure in response to rising car speed, as is known.

As shown in the lower part of FIG. 6a the front flange 170 of the fluid coupling housing 40 has a bore 324 which can fill the casing 40 and fluid coupling 40—42 through an opening 326 from an oil supply passage or gland 328 in the stationary wall 114. The bore 324 contains an inlet valve 330 urged closed by a spring 332 to prevent communication between the gland 328 and the interior of the fluid coupling. Whenever the fluid coupling is to be filled, oil under pressure is supplied by the control system to the gland 328, the pressure opens the valve against the force of spring 332 and oil flows into the coupling. The spring 332 has sufficient force to hold the valve closed against centrifugal force.

As shown in the upper half of FIG. 6a the front flange 170 also has an outlet bore 340 leading from a vent passage 342 of the fluid coupling to the space 344 surrounding the fluid coupling casing 40 which communicates with the usual sump forming part of the casing 116, which is substantially at atmospheric pressure, as is known. The outlet bore 340 contains a fixed valve sleeve 346 which guides a reciprocal valve assembly, including valve cap 348 mounted on a stem 350 integral with a piston 352 slidable in the sleeve. A spring 353 normally urges the valve outward, that is upward as FIG. 6a is seen so that the valve cap vents the coupling to the space 344 through the passage 354 matching the vent opening 342. The space between the sleeve 346 and the piston 352 forms a valve closing chamber 356 which is in communication with the passage 357 in the flange 170 which in turn is in communication with a gland 358 in the wall 114 to which oil under pressure may be admitted from the control system to urge the piston 352 inwardly against the spring to close the exhaust valve. Whenever the fluid coupling is to be filled oil under pressure is supplied from the control system to the gland 358 to close the exhaust valve 348 and oil under pressure is admitted to the inlet passage 326 to open the inlet valve 330 and supply fluid to fill the coupling, as will be explained below in the discussion of the control system. In order to empty the fluid coupling, the control system cuts off fluid from the passages 326 and 358. The spring 352 then opens the vent valve and the fluid is drained from the coupling by centrifugal force. Preferably a number of inlet valves and exhaust valves like those shown in FIG. 6a are disposed about the circumference of the flange 170 in order to effect rapid filling and emptying of the coupling.

*Parking Brake*

The car may be braked or locked for parking by positively locking the output shaft 16 against rotation by means of the gear 294 which may be engaged by a pawl 360, shown in FIGS. 7 and 8. The pawl is mounted on a fixed pivot 362 and can be moved into or out of locking engagement by a toggle including a link 364 and an arm 366 keyed to an operating shaft 368 journalled in a boss 370 forming part of the frame or casing 116 of the transmission. Spring 372 (FIG. 8) constantly urges the arm 366 to rotate clockwise as FIG. 7 is seen and push the pawl into locking engagement with the gear 294. If the end of the pawl strikes a tooth instead of the space between teeth the spring continues to urge the pawl resiliently into parking position, so that upon slight rotation of the output shaft the end of the pawl drops between the teeth and locks the gear to the frame. When in locking position the toggle is over the center, that is the pivot 374 between the arm 366 and the link 364 has been moved by the spring 372 past the line joining the center of the shaft 368 with the center of the pivot 376 which joins the link 364 to the pawl 360. When the car is parked, the arm 366 is stopped by a pin 378 of a hydraulic parking brake release mechanism which pin is positioned as shown in FIG. 7 so that it is supported against movement away from the toggle by the plate 380 forming part of the casing 116 of the transmission. In this position the toggle and pin form a positive lock against disengagement of the pawl 360.

Pin 378 is secured to a piston 382 in a hydraulic releasing chamber 384 in a cylinder 386. Whenever the car is stopped and controls to be described below are placed in parking position, the cylinder 384 is vented and the spring 372 moves the pawl into engagement with the gear 294. When the car is to be driven, oil under pressure is supplied to the chamber 384 by the control system, as will be described, so that the piston 382 pushes the pin up against the force of the spring to break the toggle and positively remove the pawl from the gear. It is necessary to have the engine running to supply the control system with oil under pressure for releasing the brake, as above described. In order to be able to move the car if the engine will not run, the shaft 368 is keyed to a release shaft 388 (FIG. 8) which may be positively rotated by a release arm 390 to rotate the link 366 counterclockwise, as FIG. 7 is seen, to release the parking lock. The release lever 390 may be linked to any suitable part of the control system in known manner.

CONTROL SYSTEM

In general the control system includes the front and rear pumps 96 and 98 which constitute reservoirs or sources of control oil under pressure whenever the engine is running or the car is moving forward; a manually operated selector valve which determines whether the transmission will drive the car forward or backward, and if forward, whether it will be held in first speed, or will be permitted to upshift automatically to second speed only or to second and third speeds; a pump pressure regulator which normally maintains a constant pump pressure but which can be influenced by various modifiers or modulators to change the pressure as may be required by different driving conditions; a clutch shift valve for selectively setting or releasing the direct drive clutch 48; a fluid coupling shift valve for selectively filling and emptying the fluid coupling; a stator control valve for placing the stator blades in either high or low angle; and various relay, blocker or inhibitor valves which permit or prevent operation of other elements of the control system in accordance with the requirements of automatic and manual gear ratio selection. The shift valves are urged to shift up by governor-generated pressure as the speed of the car increases and are urged to shift down by pressure representing torque or power demand as indicated by throttle opening.

*Low Speed Forward*

Referring to FIGS. 9, 9a, 9b, 9c, the front pump 96 takes in oil from a sump 398, customarily formed by a portion of the transmission casing 116, and discharges oil under pressure to a main line 400. The pressure of the main line urges to the left in FIG. 9 the valve stem 401 of a pressure regulator valve generally designated by 402, against the force of a return spring 403 in a pressure chamber 403a. As disclosed in the Herndon Patent 2,763,162 this arrangement maintains a constant pressure in the main line 400 when there is a constant pressure or no pressure in the chamber 403a, but the pressure of the main line can be changed by changing the pressure in the chamber 403a.

Assume that the engine is idling with closed throttle and that the car is standing with the parking brake set. The main line 400 is connected to the line port 404 of the manual valve, generally designated 406 (FIG. 9a) having a valve stem 408. When this valve stem is in the L or low range position shown its lowermost land 410 blocks the exhaust port formed by the open end 412 of the manual valve 406 and its central land 414 separates the main line port 404 from the reverse port 416. Main line pressure is supplied to the parking brake release port 418, the drive range port 420, the intermediate range port 422 and the low range port 424. In all drive positions oil is conducted from the parking brake release port 418 by conduit 426 to the previously described parking brake release cylinder 384 (FIG. 9) which, when filled under pressure, moves the piston 382 to release the parking brake to permit the car to be started. The rear pump 98 at this time is not operating. Oil from drive port 420 is conducted by line 432, rear pump discharge line 434, and line 436 to the cylinder 90 to set the forward reaction torque-establishing device 88, which, therefore, in any forward drive position of the manual valve prevents reverse rotation of the rear reaction sun gear 70 through the one-way clutch 86 and permits the establishment of first and second speed drives. Oil from the low port 424 of the manual valve 406 is conducted by lines 438 and 440 to the cylinder 50 which sets the overrun clutch 48. Oil is conducted from the intermediate port 422 by conduits 442 and 444 to the cylinder 94 to set the overrun torque-establishing device 92.

Having set the forward reaction torque-establishing device 88, the overrun torque-establishing device 92 and the overrun clutch 48 the gearing is conditioned for drive in low gear, as explained above, whenever the throttle is subsequently opened.

The main line 400 is connected to a pressure divider valve 446 in FIG. 9 which supplies oil at 40% of main line pressure to the torque converter through torque converter charging-line 448, which maintains the converter filled with oil under pressure in the manner known in the art. The pressure-divider valve 446 includes a small piston 450 connected to a large hollow piston 452 which latter has opening 454 controlling flow from the main line entry port 456 to the converter charging-line 448. The pistons are urged to the left as FIG. 9 is seen to increase the area of communication between main line and converter-charging line by oil at main line pressure in the opening chamber 458 acting on the small piston 450, and the pistons are urged to the right, as FIG. 9 is seen, to decrease or prevent communication between the main line and converter-charging line 448 by the pressure of oil in the converter line against the large piston 452. The diameters of the pistons are so chosen that the pressure in line 448 is maintained at 40% of the pressure in the main line 400.

The pressure of oil in the converter urges the stator control piston 158 (FIG. 9) toward the left or high angle position. When the throttle is closed, as will be explained, there is no pressure in the stator control chamber 160 which is vented, so the piston moves fully to the left to hold the blades in high angle to prevent creep of the car.

The control system includes a throttle valve 460 normally urged closed, or up, as seen in FIG. 9a by a spring 462 and which can be opened against the force of the spring by a plunger 464 moved downward by any suitable means, not shown, connected to the mechanism which operates the throttle of the engine. The spring 462 also urges downward as FIG. 9a is seen, a throttle regulator valve 468 having a land 470 which controls communication between the main line 400 and a regulated pressure chamber 472, and a land 474 which controls communication between the regulated pressure chamber and an exhaust port 476. The regulated pressure chamber 472 is connected to a pressure regulating chamber 478. The spring 462 urges the valve 468 down against the pressure in the chamber 478 and this maintains in the regulated pressure chamber 472 a pressure measured by the force of the spring 462, which in turn is measured by the amount of throttle opening, as is known. The pressure in chamber 472 is called TV pressure herein. This pressure is used to control the shift valves, as will be explained.

The throttle valve 460 has a land 480 which when the throttle is closed blocks an entry port 482 connected to the main line 400 and it has a groove 483 which after the throttle is opened slightly can conduct oil from the main line port 482 to a drive throttle port 484 and thus supply main line pressure to a stator control valve supply line 486, which leads to a low angle holding cylinder 487 of a stator control valve generally designated 488 having a valve stem 489. FIGS. 9, 9a, 9b and 9c show the control system with the throttle closed. The low angle hold cylinder 487 is vented through the line 486 at the throttle valve by way of port 484 of the throttle valve, groove 483 and exhaust port 490. Thus the cylinder 487 exerts no force on the stator control valve stem 489 and the valve is closed, held in the position shown by the spring 491 so that the groove between lands 492 and 493 vents the stator control conduit 494 at exhaust port 495 to vent the stator cylinder 160 to permit converter pressure to hold the piston 158 to the left, which holds the stator blades 150 at high angle. As is known, when the blades are at high angle that is the blades are nearly transverse to the flow so that each blade makes a large angle with the plane determined by its shaft 152 and the axis of the transmission, and the engine is idling, the stator tends to prevent creep of the car. When the throttle is opened sufficiently to drive the car the land 480 on the throttle valve 460 moves to a position below that shown in FIG. 9a, namely to the position shown in FIG. 10a, and opens the inlet port 482 to fill the low angle holding chamber 487 on stator control valve 488 with oil at main line pressure. This pushes down the piston 496 connected to the large piston 497, which in turn pushes down the loose pin 498, which in turn pushes down or opens the normally closed stator control valve proper 489 against the force of closing spring 491 so that the groove between lands 492 and 493 conducts oil from the main line 400 to the low angle stator control line 494 connected to the low angle holding cylinder 160 to overcome converter pressure and move the stator blades to low angle. This is shown in FIG. 10 and is the normal position of the stator blades for driving except under high torque demand, as will be explained. The car can now start in low gear or first speed with the stator blades in low angle.

The rear pump discharge conduit 434 is supplied with oil at main line pressure from the drive port 420 on the manual valve 406, and this supplies both governor valves 100 and 102 as shown in FIG. 9c until the rear pump 98, begins to deliver oil at sufficient pressure, in response to motion of the car. When this occurs both front and rear pumps supply the control system, and at a predetermined speed of the car at which there is a predetermined pressure in the line 400 supplied by both pumps, pressure of the front pump is reduced by the main regulator valve 402 and the front pump is unloaded, as is known. At this time the rear pump alone supplies the control system, the check valve 500, FIG. 9, opening to permit the oil from the rear pump to reach parts of the system formerly supplied by the front pump alone. However, the car does not usually run fast enough in first speed for the rear pump to take over, this occurring usually at about 45 m.p.h., for example.

The governor valves 100 and 102, supplied by the front pump and/or rear pump as driving conditions determine, as is known, each generate a pressure which is a measure of the speed of the car, the valve 100 providing a given pressure at a lower speed than the valve 102. The low speed pressure from valve 100 is called $G_1$ pressure herein and the high speed pressure from valve 102 is referred to as $G_2$ pressure herein.

As soon as the car reaches a predetermined forward speed the large piston 497 of the stator control valve 489 is held downwardly by $G_1$ pressure which is conducted to it by line 502 which is always connected to $G_1$ control line 504. The purpose of this is to hold the stator control valve open against the spring 491 whenever the car reaches an appreciable speed, so that if the throttle should be closed immediately after starting, as often happens in start and stop driving, the $G_1$ pressure will hold the stator valve open and maintain the blades in low angle for normal driving conditions. Whenever the car is being driven in low gear the stator blades cannot be moved to high angle, as will be explained.

As long as the manual valve is in the low range position, shown in FIG. 9a, the automatic shifting mechanism cannot establish a higher gear ratio because the direct clutch chamber 82 is vented and cannot set the clutch 80, which must be set to establish either second or third speed drive. The direct clutch chamber 82 is vented by a second speed blocker valve or direct clutch blocker valve 510 in FIG. 9b which connects to exhaust port 512 the direct clutch apply line 514 which is connected to the previously described clutch passage 214. The second speed blocker 510 is held closed to vent the line 514 against the force of opening spring 516 by the pressure of oil in a closing chamber 518 which is filled at line pressure from previously described overrun clutch apply conduit 440 which is connected through line 438 to main line at low port 424 of the manual valve 406 whenever the control is set for low range.

Since overrunning sometimes imposes a very heavy torque on the overrun clutches the line pressure is increased above normal to sustain this torque whenever the car is operating in low speed established by the manual valve, which is to say low range, and the increased line pressure varies according to car speed. This is accomplished by a low gear modulator valve 520 which supplies to the modulating chamber 403a of the main regulator valve 402 modulating pressure which increases as the car speed increases. The low modulator valve 520 includes a valve stem 546 urged open or to the left, as FIG. 1 is seen, by a spring 548 and by $G_1$ pressure in the chamber 550 connected to $G_1$ supply line 504, and when moved to the left admits oil from the low range control line 438 to a regulated pressure chamber 552. The valve stem is urged to the right to close the entry from line 438 and to open an exhaust port 554 by the pressure from regulated pressure chamber 552 acting in regulating pressure chambers 556 and 558, connected to a modulated pressure delivery line 560 connected through a shuttle valve 562 and line 564 to the chamber 403a of the main regulator valve 402. This arrangement provides a pressure in the chamber 403a which is normally determined by the spring 548 but which is increased as car speed increases. Consequently, when driving in low range the pressure in main line 400 is maintained above the normal pressure which the main pressure regulator valve would otherwise provide, and this higher pressure is further increased with increasing car speed.

The low modulator pressure valve 520 is supplied only from the low range control line 438, which line is vented at exhaust port 412 by land 410 in all positions of the manual valve except low range, so that this modulator operates only in low range.

*Intermediate Drive Range*

In order to drive the car in intermediate range, in which either 1st or 2nd speed is selected automatically in accordance with driving conditions, the manual valve is placed in the "I" for intermediate position as shown in FIGS. 10-10c. This conditions the car for low speed drive, substantially as shown in FIGS. 9-9c, because the rear pump discharge conduit 434 connected thru the manual valve 406 to the main line 400 in all drive positions fills the cylinder 90 to set the low forward reaction torque-establishing device 88 and the conduit 442 supplied from the intermediate range port 422 is connected to the conduit 444 which fills the cylinder 94 to set the overrun torque-establishing device 92. However, there is this difference between low speed drive in low range and low speed drive in either of the automatic ranges; the overrun torque establishing device cylinder 50 is vented at low range port 424 of the manual valve in both automatic ranges, consequently the car can overrun or freewheel in low gear.

The parking brake release is energized from the parking port 418 of the manual valve 406, as described in connection with FIGS. 9-9c. This permits the car to be started in low gear when the throttle is opened. When the throttle is closed the stator is held in high angle to prevent creep, as described in connection with FIGS. 9-9c.

When the throttle is opened to drive the car, the stator is returned to low angle, as described in connection with FIGS. 9-9c.

As the car increases in speed there is a tendency to shift up into 2nd speed but the upshift is delayed if there is a high torque demand as indicated by high throttle opening. This is accomplished as follows—a direct clutch valve or 1-2 shift valve 570 in FIG. 10b can connect main line 400 to line 572 which can supply pressure to set the direct clutch through the direct clutch blocker valve or second speed blocker valve 510 which is now opened by its spring 516 (there being no pressure in closing chamber 518 because this chamber is vented through lines 440 and 438 at port 412 of manual valve 406) to connect line 572 to the direct clutch line 514 (FIG. 10b), and the shifter valve 570 can disconnect main line 400 from conduit 572 and vent conduit 572 at exhaust port 573 to release the clutch 80 (FIG. 9b). The shifter valve 570 includes a valve stem 574 which is urged up or open against closing spring 575 and so as to apply the clutch 80, by $G_1$ pressure in an opening chamber 576 and an opening chamber 578 which are supplied from the $G_1$ line 504. The valve stem 574 is urged down to release the direct clutch by the TV pressure from chamber 472 of the throttle regulator valve which is connected to closing chambers 580 and 582 by conduit 583. When the speed of the car has increased enough to make second gear drive appropriate at any particular throttle opening the force of $G_1$ pressure in chambers 576 and 578 overcomes the force of TV pressure in chambers 580 and 582 and the valve upshifts to connect mainline 400 to line 572 and apply the direct clutch 80 and establish second gear drive.

The transmission is automatically downshifted to first gear drive whenever torque demand increases at a given speed to the point where first gear drive is required, as indicated by the throttle opening. When this occurs TV pressure in chambers 580 and 582 overcomes $G_1$ pressure in chambers 576 and 578 and moves the valve stem 574 down to block main line 400 and vent conduit 572 to release the clutch.

Hunting between upshift and downshift at substantially the same speed is prevented by the hydraulic latch effected by conduit 584 and piston 586 between TV downshift chambers 580 and 582. Whenever the governor pressure is increasing and the car is in first gear preceding an upshift, TV pressure is exerted in both chambers 580 and 582 (FIG. 9b) but after the upshift the piston 586 is moved up to close the conduit 584, as shown in FIG. 10b, and connect chamber 582 to vent port 590 in the throttle valve by conduit 592 which is always connected to conduit 594. This removes the downshift force from chamber 582 and thereafter requires a higher throttle opening and higher TV pressure in chamber 580 alone to effect a downshift at a particular speed than is required to prevent an upshift at the same speed. Conversely, after a downshift caused by a particular throttle opening at a particular speed which is effected by TV pressure in the chamber 580 alone, piston 586 cuts off chamber 580 from vent line 592 and connects the chamber 580 to the chamber 582 through line 584, which increases the downshift force on the valve 574 and requires a greater car speed to upshift at a particular throttle opening than the speed which permitted the downshift at that throttle opening.

When in intermediate range the transmission can be downshifted to first speed manually or in response to torque demand at car speeds above the speed which would automatically downshift to first speed. This is done by pushing the throttle operating mechanism beyond full throttle opening to cause a stop 600 on the throttle valve stem 464 to depress a detent valve 602 against a spring 604 far enough to close exhaust port 590 and connect TV pressure line 583 to the line 594 which is always connected to the line 592 and thus pressurizes the previously vented downshift chamber 582. Line 594 also directs TV pressure through line 605 to a forced downshift chamber 606 in the 1–2 shift valve 570. At full throttle opening the TV pressure is high, and may substantially equal line pressure. This pressure in chamber 606 opposes G–1 pressure in chamber 576 and acts in downshift chambers 580 and 582. This can overcome G–1 pressure and move the valve 574 down to vent line 572 and place the transmission in low or first gear, or hold it in low if it has not upshifted. When the 1–2 shift valve is in the downshifted position TV pressure acts on total area of piston 606a to oppose upshift, so that upshift will occur at some definite car speed after forced downshift. When upshift has occurred, the small hydraulic latch piston 606b enters the small bore 606c and so cuts off TV pressure from the area of the small piston. This reduces the force opposing upshift and so the valve 574 is kept upshifted by governor pressure until car speed is reduced below the value at which upshift occurred. This prevents hunting. The device can be calibrated to shift down by flooring the throttle in this manner regardless of car speed. However, it is frequently undesirable to be able to place the transmission in low gear at high speed and where this is so the areas of the pistons in the 1–2 shift valve, the governor pressure G–1 and the TV pressure can all be so related that the clutch shifter valve cannot downshift above a predetermined car speed.

The valve 602 is called a detent valve because it offers an opposing force to movement of the throttle linkage past wide open position, which force is reduced after such movement is completed. It is analogous to the opposition provided by a spring poppet or detent which is sometimes used for the same purpose. This opposition by the detent valve is accomplished as follows.

During all operation from closed throttle to full throttle, TV pressure is always present in the space 608 surrounding the detent valve 602. Because the area of the land 610 is larger than the area of the land 612 this pressure exerts an upward force on valve 602 which assists spring 604 in opposing its movement by the throttle mechanism, which force is felt by the driver in the usual throttle foot pedal as soon as the stop 600 touches the valve 602. Consequently, the driver knows when he is about to downshift and this tends to prevent inadvertent downshift. However, as soon as the detent valve has moved enough to close vent port 590 and connect TV line 583 to downshift line 594, a cut-off land 614 cuts off the TV conduit 583 from land 610, and land 610 uncovers a passage 616 which vents pressure between lands 610 and 614 at the open end of the bore surrounding valve 602. This removal of pressure from land 610 reduces opposition to movement of the valve 602, which is felt by the driver in the pedal, so that the driver knows he has completed the movements necessary for downshifting. This is desirable when attempting to downshift at high speed.

When the car is being driven in second or third gear it can be placed in low by moving the manual valve 408 to the L position shown in FIGS. 9–9c. However, it is undesirable to place the car in low by manual control if the car is moving above a predetermined speed. In order to prevent this I provide a manual low inhibitor valve 618 in FIG. 10b normally opened by a spring 620 to connect line 438 to line 440 to pressurize the overrun torque-establishing device cylinder 50. This valve can be closed to vent cylinder 50 and the manual low control line 438 at vent port 621 by a closing cylinder 622 connected to the $G_2$ pressure line 624. The valve is closed whenever the speed of the car is above a predetermined value. If then the manual valve is moved to the low position, the overrun torque-establishing device 48 cannot be set and this prevents establishment of low gear. Although the forward reaction torque-establishing device 88 remains set, this cannot establish low gear connection between the engine and propeller shaft because the gearing input shaft 52 and the impeller 42 are rotating faster than the casing 40 and the one-way clutch 46 is running free. But, when the car speed drops to a safe predetermined value, the speed-responsive manual low inhibitor valve 618 opens to pressurize the cylinder 50 to set the over-run torque-establishing device 48' and to pressurize the closing cylinder 518 to close the second speed blocker valve 510 and vent cylinder 82 to disestablish second speed. This establishes the low gear connection.

When driving in second or third speed, the overall torque ratio of the transmission can be increased manually or in response to torque demand without changing the gear ratio. This is done by opening the throttle valve 75% which may represent substantially full power from the engine. When the throttle is open this much the throttle valve 460 is moved down far enough for the land 480 to connect a .75T throttle port 626 with main line port 482 which now supplies main line pressure by the line 628 to a stator inhibitor valve 630 in FIG. 10a. When the car is in second or third speed the line 514 is pressurized to fill chamber 82 to set the clutch 80, as explained above, and this line 514 is connected to the stator inhibitor valve 630 at the opening chamber 632 so that the valve stem 634 is opened, that is held up against its closing spring 636 to supply line pressure from line 628 to line 638 which feeds line pressure to a governor inhibitor chamber 640 in the stator control valve 488. This overcomes G–1 pressure above piston 497 and pushes up the piston against line pressure in chamber 487. This permits spring 491 to close the stator control valve 489 to cut off main line 400 from stator control line 494 and vent stator control cylinder 160 at exhaust port 495. This position of the stator control valve is shown in FIGS. 9b and 11b. This places the stator in high angle in response to torque demand as indicated by three-quarters throttle opening.

It is undesirable to have the stator in high angle at high car speeds. To prevent this the piston areas in the stator control valve and the governor pressure are so chosen that the stator control valve cannot be in closed position when the car is going faster than a predetermined speed, for example 75 m.p.h. This is accomplished with the aid of an opening chamber 642 supplied with G–2 pressure from the G–2 line 624. This exerts opening force on the valve due to the difference in areas of the land 493 and guide plug 646 of the valve stem 489, which at 75 m.p.h. is high enough to assure that the valve is held down or open. I prefer it to be impossible to have the stator in high angle when the car is being driven in low gear, whether the low gear is manually or automatically selected. When the car is moving and the stator has been moved from its anti-creep position to low angle, as above described, the only way the stator can be placed at high angle is by closing the stator control valve 488 to vent the stator cylinder 160. This can only be done by pressurizing the governor inhibitor chamber 640 of the stator control valve. It is noted that the line 638, which pressurizes chamber 640 can only be pressurized when the stator inhibitor valve 630 is open, and this can be opened only by pressure in the chamber 632, which in turn can be pressurized only when the direct clutch apply line 514 is pressurized, which means that the stator can be in high angle only when the transmission is in second or third speed, if the car is moving forward.

In first speed manually selected, the direct clutch apply line 514 is vented at port 512 of the opened second speed blocker valve 510.

When full throttle downshift to first speed is to be made the stator is in high angle because the throttle has been opened more than three quarters. Accordingly, it is necessary to move the stator to low angle when downshift occurs. At the moment of downshift the 1–2 shift valve 570 vents line 572, which vents the direct clutch line 514 to which it is connected through the normally open second speed blocker 510. Venting the high speed clutch line 514 vents the opening chamber 632 of the stator inhibitor valve 630, which is then closed by its spring 636 to cut off line 628 from line 638 and vent chamber 640 at exhaust port 648. This permits $G_1$ pressure to open the stator control valve 488 to pressurize the stator control cylinder 160 and return the stator to low angle.

Under normal conditions of automatic drive, that is with the transmission in either second or third speed, it is desirable to reduce line pressure as the speed of the car increases, because with increasing speed the load on the torque-establishing devices, such as the direct clutch 80, is reduced so that their torque can be sustained by a lower clutch pressure. Therefore, power is saved by reducing the pump pressure as the speed of the car increases. In order to accomplish this the pressure modulating chamber 403a of the main pressure regulator valve is supplied with a pressure which decreases as car speed increases by a normal pressure modulator valve 660 in FIG. 10a. The pressure modulator valve 660 includes a valve stem 662 urged open (toward the right in FIG. 10a) by a spring 664 to admit oil from the main line 400 to a regulated pressure chamber 666 and urged closed to cut off the main line 400 and open exhaust port 668 by the regulated pressure exerted in a regulating chamber 670. As so far described this arrangement, as is known, maintains in the pressure chamber 670 a fixed pressure determined by the force of the spring 664. This pressure is conducted by lines 672 and 564 to the booster chamber 403a of regulator valve 402. When the system is first started this establishes a higher pressure in the line 400 than the transient pressure before the chamber 403a can begin to act but when the system becomes stable the arrangement so far described maintains constant pressure in the main line 400. This pressure in the main line 400 is reduced as the speed of the car increases by a pressure chamber 674 filled at $G_1$ pressure, and chamber 676 filled at $G_2$ pressure, both of which chambers urge the valve 602 to close against the spring 664 and thus reduce the pressure supplied to the booster chamber 403a. Reduction of the boost pressure reduces main line pressure. The boost pressure in chamber 403a can be increased with torque demand, if desired, by any suitable known means such as by placing the spring 664 in a chamber 678 closed by a flexible diaphragm 680 exposed to the atmosphere, the chamber being connected to the induction manifold of the internal combustion engine which drives the car.

The shuttle valve 562 directs to boost chamber 403a of the main regulator valve 402 whichever modulating pressure is higher at any moment. Since the manual low modulator valve 520 can only function when the transmission is in low range, it follows that its pressure is zero at all other times and the normal modulator prevails, moving the shuttle valve 562 to the right as seen in FIG. 10a. Since the low range modulating valve generates a pressure which increases with car speed but does not change with torque demand, and since the normal modulating valve generates a pressure which increases with torque demand but decreases with speed, it will be possible for one or the other of the modulators to prevail, according to speed and torque conditions, when the transmission is operating in low range.

When the manual valve 408 is set for intermediate range, as shown in FIG. 10a, the transmission will start in low gear and automatically shift between first and second gear as determined by car speed and throttle opening. As shown in FIG. 4 in order to effect third speed or direct drive the fluid coupling 42—44 must be filled. When the manual valve is set for intermediate range the fluid coupling cannot be filled and this prevents establishment of third speed. The fluid coupling is filled and emptied by a fluid coupling relay valve 690 (FIG. 10) urged closed or to the right as FIG. 10 is seen by a closing spring 692 to vent the fluid coupling supply line 328 (FIGS. 6a, 10) at exhaust port 696. When open, the fluid coupling relay valve 690 closes exhaust port 696 and connects the fluid coupling supply line 328 to main line 400 but it can be opened only by pressure in an opening chamber 698 supplied by a conduit 700 controlled by a 3rd speed blocker valve 702 (FIG. 10c). This latter valve is urged open by a spring 704 and can be closed (as shown in FIG. 10c) by pressure in a closing chamber 706 connected between previously described conduits 442 and 444 which are energized from the intermediate port 422 of the manual valve 406. Therefore, in intermediate range, the third speed blocker valve is closed, as shown in FIG. 10c and the line 700 is vented at exhaust port 708. This prevents filling of the fluid coupling.

*Direct Drive Range*

In order to start the car in direct drive range in which 1st, 2nd and 3rd gear is selected automatically in accordance with speed and torque conditions, the manual valve stem 408 is placed in the D for drive position, as shown in FIG. 11a. This vents the intermediate range control line 442 through intermediate port 422 and vent port 412 of the manual valve, and so vents the closing chamber 706 of the 3rd speed blocker valve 702, permitting this valve to be opened by the spring 704 so that the fluid coupling 42, 44 can be filled as will be explained. Venting the intermediate control line 442 also vents the line 444 and consequently the overrun torque-establishing device apply chamber 94. Otherwise the controls are now conditioned for drive in 1st and 2nd speed as described in the explanation of the intermediate drive range. The throttle is closed, the stator is in high angle to prevent creep and low gear drive is established by pressurizing the forward reaction torque-establishing device chamber 90 through lines 434 and 436, as has been described. When the throttle is opened the stator will be returned to low angle, the transmission will start in first gear and will shift up into second gear as car speed increases as described in the explanation of the intermediate drive range.

It is noted that when the transmission control is set for either intermediate or direct drive range the forward reaction torque-establishing device apply chamber 90 is pressurized to establish low gear drive and the direct clutch member 82 is pressurized by the 1–2 shift valve 570 automatically in response to driving conditions. When the fluid coupling 42—44 is filled the third speed drive is picked up without releasing the low speed reaction torque-establishing device 88 and the sun gear 70 overruns the torque-establishing device 88 because of the one-way clutch 86. In order to effect a smooth transition from 1st gear to second gear drive the direct clutch chamber 82 is filled gradually to engage the clutch 80 gently. This may be accomplished by any suitable timing or cushioning device. I prefer to use the accumulator and timing valve arrangement shown in FIGS. 9c, 10c and 11c. This includes an expansible chamber 720 closed by a piston 722 urged to the right by a spring 724 and urged to the left by the difference in pressure between lines 514 and 214. The piston has a slow flow passage 726 which always connects lines 514 and 214, and a fast flow passage 728 normally closed by a ball check valve 730, which can be pushed off its seat by a pin 732 to open the fast flow passage.

Whenever the direct clutch apply line 514 is first pressurized the direct clutch chamber 82 and the chamber 720 have been vented and consequently these spaces are at low pressure. The line pressure in the passage 514 pushes the piston 722 to the left so that pin 732 opens the fast flow passage 728 and oil flows rapidly through the passage 728 to fill the reduced volume of the chamber 720 and the clutch chamber 82. It is intended that this space will be filled quickly to take up clearance between the clutch plates 202 and 204 of the clutch 80. When the clearance is taken up the pressure in the clutch chamber 82 and space 720 will tend to increase suddenly, which if permitted would cause the clutch to grab and give a rough shift. This is prevented by the expansion of the chamber 720. As soon as the slack is taken up the increase of pressure in chamber 720 moves the piston 722 away from the pin 732, seating the ball and closing the fast-flow passage. After that oil flows slowly thru the passage 726 and gradually builds up pressure in the clutch chamber 82 and in the expanding accumulator chamber 720. Consequently full torque capacity of the clutch 80 is established gradually. This makes a gentle transition from 1st speed drive to second speed drive.

When the transmission is shifting down from second speed to first speed the line 514 is vented and the check valve 730 opens to permit rapid release of the clutch 80. This is desirable to give the engine time to speed up to the higher speed required for first gear drive, as is known. Since first speed is established as soon as the one-way clutch 86 locks up, this arrangement provides a smooth downshift.

After the speed and torque conditions establish second gear drive as described in the explanation of intermediate range, further increase in car speed establishes third speed drive through the action of a 2–3 shift valve 740 now to be described, and as shown in FIG. 11a.

The 2–3 shift valve 740 is similar in construction and operation to the 1–2 shift valve 570. Each shift valve is held closed, or downshifted, when there is no pressure in the control system, by a light spring 575, in order to insure the valve being closed when the system is started, at which time there may be zero throttle pressure. As soon as the 1–2 shift valve 570 has opened or upshifted, the main line 400 is connected to the line 572 to establish 2nd gear drive as has been explained. This operation of the 1–2 shift valve 570 also connects the main line 400 to a supply passage 742 leading to the 2–3 shift valve 740. At low speed or at relatively high torque demand the valve stem 744 of the 2–3 shift valve 740 is held closed, as shown in FIG. 10a, by the spring 575 and/or TV pressure in closing or downshift chambers 746 and 748. With the valve closed, the line 742 is blocked by the valve stem 744 and a third speed control line 750 is vented at exhaust port 752. The valve stem 744 is urged to open or upshift by upshift chambers 754 and 756 supplied with G₂ pressure from the line 624. At some given throttle opening the G₂ pressure at some predetermined car speed is sufficient to move the valve stem 744 up against TV pressure in chambers 746 and 748 to close the vent 752 and connect main line pressure from 742 to the 3rd speed control line 750 as shown in FIG. 11a. This upshift always occurs after upshift of the 1–2 valve 570 so that the line 742 is supplied with main line pressure. When the valve 744 upshifts, the third speed control line 750 is pressurized, and since third speed blocker valve 702 is open, as above described, this pressurizes the line 700 and pressurizes closing chamber 356 of the fluid coupling vent valve 348 (FIGS. 6a, 11b). This closes the vent valve as previously described. The line 700 also opens the fluid coupling relay valve 690 (FIG. 11) by pressurizing the chamber 698 and this connects main line 400 to the fluid coupling filling passage 328 (FIGS. 6a and 11). This fills the fluid coupling to establish third speed or direct split torque drive as described in connection with FIG. 4. The forward reaction torque-establishing device 88 remains set but the one-way clutch 86 freewheels as permitted by the overrun torque-establishing device 92.

Increase of throttle opening at a given speed or decrease of speed at a given throttle opening will cause the 2–3 shift valve 740 to downshift to establish 2nd speed drive by venting the third speed control line 750 at exhaust port 752 which vents the vent valve closing cylinder 356 permitting the fluid coupling vent valve 348 to be opened by the spring 353 (FIG. 6a). Venting of the line 700 also permits the fluid coupling relay valve 690 to be closed by its spring 692 to cut off supply of oil from the main line 400 to the fluid coupling filling passage 328 (FIGS. 6a, 11).

Whenever the 2–3 shift valve 740 upshifts, a hydraulic latch valve 760 is moved up to close hydraulic latch line 762 and vent downshift chamber 748 at line 594 to prevent hunting between upshift and downshift at a given speed or at a given throttle opening as described in connection with the 1–2 shift valve 570.

As in second gear drive the overall torque ratio of the transmission may be increased in third gear, without changing the gear ratio, by moving the stator blades to high angle by opening the throttle valve about three quarters, as shown in FIG. 11a, in which case the line 628 is pressurized to move the stator blades to high angle if permitted by the G₂ pressure, as described above.

At a given speed the transmission may be downshifted from third gear to second gear in response to torque demand by moving the throttle-operating mechanism past full throttle position as described in connection with intermediate range operation. It is noted that the 2–1 downshift line 605 is also connected to a forced downshift chamber 770 in the 2–3 shift valve 740. When this chamber is pressurized the valve is downshifted or prevented from upshifting in a manner similar to that described for the 1–2 shift valve 570. The 2–3 shift valve 740 can be constructed to shift down at three-quarters throttle opening at any speed, but it is preferred to select the pressure areas of the valve and the throttle pressure and governor pressure so that downshift to second speed cannot occur above some predetermined car speed; for example 75 m.p.h.

*Reverse Drive*

To drive the car backward the manual valve stem 408 is placed in the R for reverse position which is one position below the low position in FIG. 9a. In this position land 772 closes exhaust port 774 and land 414 cuts off main line 400 from all forward drive ports and from the parking brake release port 418, which are now vented through the open exhaust port 412. Main line 400 is connected between lands 414 and 772 to reverse port 416 which pressurizes a reverse control line 776 and moves a shuttle valve 778 down to prevent venting of the parking brake release line 776 and to supply main line pressure to this line which then releases the parking brake as in forward drive. The reverse control line 776 establishes reverse drive provided the car is not moving forward above a predetermined low speed, such as 3 m.p.h. The line 776 is connected to a reverse torque-establishing device apply line 780 through an inhibitor valve 782 which is normally held open, as shown in FIG. 12, by a spring 784 to permit communication between line 776 and 780 to establish reverse drive. To prevent establishment of reverse drive by inadvertent operation of the manual valve 406 when the car is moving forward, the valve 782 is closed whenever the car is moving forward above a predetermined low speed by a closing chamber 786 connected to the G–1 line 504. This closes conduit 776 and vents conduit 780 at exhaust port 788. It is noted that when the manual valve stem 408 is in the R position the forward reaction torque-establishing device 88 cannot be set because the forward reaction apply line 434 is vented at the D port 420 of the manual valve which is now connected to exhaust port 412. The overrun torque-establishing device cylinder 94 is vented at the intermediate port 422 of the manual valve. The direct clutch cylinder 82 is vented at exhaust port 573 of the 1–2 shift valve 570 which is held closed by its spring 575, there being no governor pressure in reverse.

Because the cylinder 82 is vented, the stator inhibitor valve 630 is closed by its spring, and the stator cannot be moved to high angle by opening the throttle three quarters. The overrun clutch cylinder 50 is vented at the low range port 424 of the manual valve.

*Neutral*

In order to prevent driving of the car without setting the parking brake the manual valve stem 408 is placed in the N for neutral position which is one position above the drive position shown in FIG. 11a. In this position all drive control lines are vented. Main line 400 is cut off from the reverse port 416 by land 414 and the reverse apply line 776 is vented at exhaust port 774. Main line 400 is connected to the parking brake release line 446 at port 418 and all drive establishing lines are vented at open exhaust port 412. This lets the car be moved.

*Park*

In order to park the car and set the parking brake the manual valve stem 408 is moved to P for park position in which all drive lines are vented as in neutral and the land 410 prevents communication between main line 400 and the parking port 418 which then vents the parking brake release line 426 at exhaust port 412 of the manual valve permitting the spring 372 in FIG. 8 to set the parking pawl 360 (FIG. 7).

When establishing forward drive the lines 436 and 444 are pressurized simultaneously and this would set the torque-establishing device 88 and 92 simultaneously unless means were provided to prevent it. It is desirable that the torque-establishing device 88 be set and establish reaction torque before any substantial torque is placed on the torque-establishing device 92 because the latter is of small capacity and is designed only to support overrun torque. To prevent simultaneous energizing of the pressure cylinders 90 and 94 a restriction 800, or slow-flow passage, is placed in the conduit 444 between the third speed blocker valve 702 and the chamber 94. Oil flows through the passage 436 into the chamber 90 faster than it flows through the restriction 800 to the chamber 94. This assures that pressure will build up to maximum line pressure in the chamber 90 to support full torque in the torque-establishing device 88 before the chamber 94 will have sufficient pressure to set the torque-establishing device 92.

In order to permit quick release of the torque-establishing device 92, for example when establishing third speed or reverse by the manual valve 406, provision is made for unrestricted flow out of the chamber 92, for example by placing the restriction 800 in a check valve 802 which is unseated against the spring 804 to permit unrestricted flow whenever the line 444 is vented after pressurizing the chamber 94.

I claim:

1. A power transmission comprising in combination, a hydrodynamic torque converter which is driven by an engine controlled by a throttle and which drives an output member, the torque converter circulating liquid through an impeller, a turbine and a bladed reaction member whose blades can be placed in a high angle position in which they redirect through a relatively large angle liquid flowing from the turbine to the impeller and can be placed in a low angle position in which they redirect such liquid through a relatively small angle; means which holds the blades at high angle in response to closing of the throttle; and means which holds the blades at low angle in response to opening of the throttle.

2. A power transmission comprising in combination a hydrodynamic torque converter which is driven by an engine controlled by a throttle and which drives an output member, the torque converter circulating liquid through an impeller, a turbine and a bladed reaction member whose blades can be placed in a high angle position in which they redirect through a relatively large angle liquid flowing from the turbine to the impeller and can be placed in a low angle position in which they redirect such liquid through a relatively small angle; means which holds the blades at high angle in response to closing of the throttle; means which holds the blades at low angle in response to opening of the throttle a predetermined relatively small amount; and means which holds the blades at high angle in response to opening the throttle a predetermined relatively large amount.

3. A power transmission comprising in combination, a hydrodynamic torque converter which is driven by an engine controlled by a throttle and which drives an output member, the torque converter circulating liquid through an impeller, a turbine and a bladed reaction member whose blades can be placed in a high angle position in which they redirect through a relatively large angle liquid flowing from the turbine to the impeller and can be placed in a low angle position in which they redirect such liquid through a relatively small angle; means which holds the blades at high angle in response to closing the throttle; means which holds the blades at low angle in response to opening the throttle a predetermined relatively small amount; means which operates in response to rotation of the output member above a predetermined relatively low speed to hold the blades at low angle regardless of subsequent closing of the throttle; means which opposes the rotation responsive means and holds the blades at high angle in response to opening the throttle a predetermined high amount; and means which operates in response to a relatively fast rotation of the output member to prevent operation of the opposing means and hold the blades at low angle.

4. A power transmission comprising in combination, a hydrodynamic torque converter which is driven by an engine controlled by a throttle and which drives an output member, the torque converter circulating liquid through an impeller, a turbine and a bladed reaction member whose blades can be placed in a high angle position in which they redirect through a relatively large angle liquid flowing from the turbine to the impeller and can be placed in a low angle position in which they redirect such liquid through a relatively small angle; means which establishes a low speed driving connection between the turbine and the output member; means which establishes a high speed driving connection between the turbine and the output member; means which holds the blades at high angle in response to closing the throttle; means which holds the blades at low angle in response to opening the throttle a predetermined relatively small amount; means which operates in response to rotation of the output member to hold the blades at low angle regardless of subsequent closing of the throttle; means which opposes the rotation responsive means and holds the blades at high angle in response to opening the throttle a predetermined high amount; and means which operates in response to establishment of the low speed driving connection to prevent placing the blades at high angle.

5. A power transmission comprising in combination, a hydrodynamic torque converter which is driven by an engine controlled by a throttle and which drives an output member, the torque converter circulating liquid through an impeller, a turbine and a bladed reaction member whose blades can be placed in a high angle position in which they redirect through a relatively large angle liquid flowing from the turbine to the impeller and can be placed in a low angle position in which they redirect such liquid through a relatively small angle; means which holds the blades at high angle in response to closing the throttle; means which holds the blades at low angle in response to opening the throttle a predetermined relatively small amount; means which operates in response to rotation of the output members above a predetermined relatively low speed to hold the blades at low angle regardless of subsequent closing of the throttle; means which opposes the rotation responsive means and holds the blades at high angle in response to opening the throttle a predetermined high amount; and second opposing means which operates in response to establishment of the low speed driving ratio to oppose the first opposing means and thereby hold the blades at low angle.

6. A power transmission comprising in combination, a hydrodynamic torque converter which is driven by an engine controlled by a throttle and which drives an output member, the torque converter circulating liquid through an impeller, a turbine and a bladed reaction member whose blades can be placed in a high angle position in which they redirect through a relatively large angle liquid flowing from the turbine to the impeller and can be placed in a low angle position in which they redirect such liquid through a relatively small angle; means which establishes a forward driving connection between the turbine and the output member; means which establishes a reverse driving connection between the turbine and the output member; means which holds the blades at high angle in response to closing the throttle; means which holds the blades at low angle in response to opening the throttle a predetermined relatively small amount; means which operates in response to rotation of the output member to hold the blades at low angle regardless of subsequent closing of the throttle; means which opposes the rotation responsive means and holds the blades at high angle in response to opening the throttle a predetermined high amount; and means which operates in response to establishment of the reverse driving connection to prevent placing the blades at high angle.

7. A power transmission comprising in combination, a hydrodynamic torque converter which is driven by an engine controlled by a throttle and which drives an output member, the torque converter circulating liquid through an impeller, a turbine, and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades at high angle and at low angle; a source of fluid under pressure; a valve which controls communication between the source and the fluid pressure operated means and so determines the position of the blades; means urging the valve to a first position which holds the blades at one angular position; a fluid pressure chamber which when pressurized opposes the urging means and holds the valve in a second position which holds the blades in the other angular position; means which operates in response to opening of the throttle to pressurize said chamber; a second fluid pressure chamber which when pressurized also opposes the urging means and holds the blades in said other angular position; and means which operates in response to rotation of the output member to pressurize the second chamber.

8. A power transmission comprising in combination, a hydrodynamic torque converter which is driven by an engine controlled by a throttle and which drives an output member, the torque converter circulating liquid through an impeller, a turbine, and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades at high angle and at low angle; a source of fluid under pressure; a valve which controls communication between the source and the fluid pressure operated means and so determines the position of the blades; means urging the valve to a first position which holds the blades at one angular position; a fluid pressure chamber which when pressurized opposes the urging means and holds the valve in a second position which holds the blades in the other angular position; and means which operates in response to rotation of the output member to pressurize the chamber.

9. A power transmission comprising in combination, a hydrodynamic torque converter which is driven by an engine controlled by a throttle and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to a predetermined relatively small opening of the throttle to pressurize the first chamber; a second fluid pressure chamber which when pressurized also opposes the urging means and holds the blades in said other angular position; means which operates in response to rotation of the output member to pressurize the second chamber; a third chamber which when pressurized opposes the first two chambers and holds the blades in said one angular position; and means which operates in response to a predetermined relatively large opening of the throttle to pressurize the third chamber.

10. A power transmission comprising in combination, a hydrodynamic torque converter which is driven by an engine controlled by a throttle and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high and in low angle; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to rotation of the output member to pressurize the chamber; a second fluid pressure chamber which when pressurized opposes the first chamber and holds the blades in said one angular position; and means which operates in response to a predetermined opening of the throttle to pressurize the second chamber.

11. A power transmission comprising in combination, a hydrodynamic torque converter which is driven by an engine controlled by a throttle and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to a predetermined relatively small opening of the throttle to pressurize the first chamber; a second chamber which when pressurized opposes the first chamber and holds the blades in said one angular position; and means which operates in response to a predetermined relatively large opening of the throttle to pressurize the second chamber.

12. A power transmission comprising in combination, a hydrodynamic torque converter which is driven by an engine controlled by a throttle and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to a predetermined relatively small opening of the throttle to pressurize the first chamber; a second chamber which when pressurized opposes the first chamber and holds the blades in said one angular position; means which operates in response to a predetermined relatively large opening of the throttle to pressurize the second chamber; a third chamber which when pressurized at a predetermined high pressure overcomes the urging means and the second chamber and holds the blades at low angle; and a source of pressure which increases with the speed of rotation of the output member connected to the third chamber to hold the valve in said second position whenever the output member is rotating above a predetermined speed.

13. A power transmission comprising in combination, a hydrodynamic torque converter which is driven by an engine controlled by a throttle and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; means which establishes a low speed driving connection between the turbine and the output member; means which establishes a high speed driving connection between the turbine and the output member; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to rotation of the output member to pressurize the chamber; a second chamber which when pressurized opposes the first chamber and holds the blades in said one angular position and means which operates in response to the establishment of the low speed driving connection to prevent pressurizing the second chamber.

14. A power transmission comprising in combination, a hydrodynamic torque converter which is driven by an engine controlled by a throttle and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; means which establishes a reverse driving connection between the turbine and the output member; means which establishes a forward driving connection between the turbine and the output member; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to rotation of the output member to pressurize the chamber; a second chamber which when pressurized opposes the first chamber and holds the blades in said one angular position and means which operates in response to the establishment of the reverse speed driving connection to prevent pressurizing the second chamber.

15. A power transmission comprising in combination, a hydrodynamic torque converter which is driven by an engine and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; means which establishes a low speed driving connection between the turbine and the output member; means which establishes a high speed driving connection between the turbine and the output member; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to rotation of the output member to pressurize the chamber; a second chamber which when pressurized opposes the first chamber and holds the blades in said one angular position; means which operates in response to a predetermined high torque demand on the engine to connect the source of pressure to the second chamber; and means which operates in response to establishment of said low speed driving connection to interrupt the connection between the source and the second chamber and to vent the second chamber.

16. A power transmission comprising in combination a hydrodynamic torque converter which is driven by an engine and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; means which establishes a low speed driving connection between the turbine and the output member; means which establishes a high speed driving connection between the turbine and the output member; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to rotation of the output member to pressurize the chamber; a second chamber which when pressurized opposes the first chamber and holds the blades in said one angular position; means which operates in response to a predetermined high torque demand on the engine to connect the source of pressure to the second chamber; a second valve which when open permits communication through said connection between the first valve and the second chamber and when closed interrupts communication and vents the second chamber; and means responsive to establishment of said low speed driving connection for closing the second valve.

17. A power transmission comprising in combination a hydrodynamic torque converter which is driven by an engine and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; means which establishes a low speed driving connection between the turbine and the output member; means which establishes a high speed driving connection between the turbine and the output member; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to rotation of the output member to pressurize the chamber; a second chamber which when pressurized opposes the first chamber and holds the blades in said one angular position; means which operates in response to a predetermined high torque demand on the engine to connect the source of pressure to the second chamber; a normally closed second valve which when open permits communication through said connection between the first valve and the second chamber and when closed interrupts communication and vents the second chamber; and means responsive to establishment of said high speed driving connection for opening the second valve.

18. A power transmission comprising in combination, a hydrodynamic torque converter which is driven by an engine and which drives an output member, the torque converter circulating liquid through an impeller, a turbine and a bladed reaction member whose blades can be held in a high angle position in which they redirect through a relatively large angle liquid flowing from the turbine to the impeller and can be held in a low angle position in which they redirect such liquid through a relatively small angle; fluid pressure operated means which selectively holds the blades in high angle and in low angle; means which establishes a low speed driving connection between the turbine and the output member; pressure-responsive means which establishes a high speed driving connection between the turbine and the output member; a source of fluid under pressure; a valve which controls communication between the source and the fluid pressure operated means and so determines the position of the blades; means urging the valve to a first position which holds the blades in one angular position; a fluid pressure chamber which when pressurized opposes the urging means and holds the valve in a second position which holds the blades in the other angular position; means which operates in response to rotation of the output member to pressurize the chamber; a second chamber which when pressurized opposes the first chamber and holds the blades in said one angular position; means which operates in response to a predetermined high torque demand on the engine to connect the source of pressure to the second chamber; a normally closed second valve which when open permits communication through said connection between the first valve and the second chamber and when closed interrupts communication and vents the second chamber; and pressure-responsive means connected to said high speed drive-establishing means for closing the second valve.

References Cited in the file of this patent

UNITED STATES PATENTS

| | | |
|---|---|---|
| 2,337,748 | Gsching | Dec. 28, 1943 |
| 2,546,378 | Winther | Mar. 27, 1951 |
| 2,651,948 | Price | Sept. 15, 1953 |
| 2,651,950 | Schou | Sept. 15, 1953 |
| 2,726,748 | Quistgaard et al. | Dec. 13, 1955 |
| 2,727,611 | Folley et al. | Dec. 20, 1955 |
| 2,882,684 | Kelley | Apr. 21, 1959 |
| 2,882,756 | Polomski | Apr. 21, 1959 |
| 2,884,813 | Kelley | May 5, 1959 |
| 2,932,940 | Edsall et al. | Apr. 18, 1960 |
| 2,964,963 | Fischer | Dec. 20, 1960 |